US008353555B2

(12) United States Patent  
Boettcher

(10) Patent No.: US 8,353,555 B2
(45) Date of Patent: Jan. 15, 2013

(54) LINK-TYPE SLIDING DOOR MECHANISM

(75) Inventor: Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 149 days.

(21) Appl. No.: 12/956,655

(22) Filed: Nov. 30, 2010

(65) Prior Publication Data

US 2012/0031004 A1    Feb. 9, 2012

Related U.S. Application Data

(63) Continuation-in-part of application No. 12/851,669, filed on Aug. 6, 2010.

(51) Int. Cl.
*B60J 5/06* (2006.01)

(52) U.S. Cl. ............... 296/155; 296/146.12; 49/154

(58) Field of Classification Search ............ 296/146.1, 296/146.11, 146.12, 155; 49/214–215, 154; *B60J 5/06*

See application file for complete search history.

(56) References Cited

U.S. PATENT DOCUMENTS

| | | | |
|---|---|---|---|
| 4,110,934 A | | 9/1978 | Zens |
| 4,152,872 A | * | 5/1979 | Tanizaki et al. ............ 49/214 |
| 4,503,638 A | * | 3/1985 | Schindehutte ............ 49/213 |
| 6,183,039 B1 | | 2/2001 | Kohut et al. |
| 6,328,374 B1 | * | 12/2001 | Patel ........................... 296/155 |
| 6,926,342 B2 | | 8/2005 | Pommeret et al. |
| 7,000,977 B2 | | 2/2006 | Anders |
| 7,393,044 B2 | | 7/2008 | Enomoto |
| 7,552,561 B2 | | 6/2009 | Schneckenleitner |
| 7,611,190 B1 | | 11/2009 | Elliott et al. |
| 8,122,644 B2 | | 2/2012 | Jarolim |
| 2008/0129085 A1 | | 6/2008 | Kim et al. |
| 2011/0126466 A1 | | 6/2011 | Adachi et al. |

OTHER PUBLICATIONS

Office Action of U.S. Appl. No. 12/851,669 dated Apr. 26, 2012.

\* cited by examiner

*Primary Examiner* — Glenn Dayoan
*Assistant Examiner* — Pinel Romain
(74) *Attorney, Agent, or Firm* — Rankin Hill & Clark LLP

(57) ABSTRACT

A vehicle sliding door mechanism is arranged to move a door from a door opening provided in a vehicle side body structure from a closed position to an open position. The sliding door mechanism comprises an upper slide rail and a lower slide rail fixed to the vehicle side body structure. An upper slider is associated with the upper rail and is movable along the upper rail, and a lower slider is associated with the lower rail and is movable along the lower rail. An upper link assembly operatively connected to the vehicle door and the upper slider, and a lower link assembly is operatively connected to the vehicle door and the lower slider. At least one link assembly of the upper link assembly and lower link assembly is configured to control a moment of force about a pivot axis while moving the vehicle door between the closed position and the open position. The moment of force is one of an opening moment and a closing moment and is dependent on a position of the vehicle door relative to the vehicle side body structure. The at least one link assembly is configured such that the moment of force is substantially zero between when the vehicle door moves between the closed position and the open position.

21 Claims, 28 Drawing Sheets

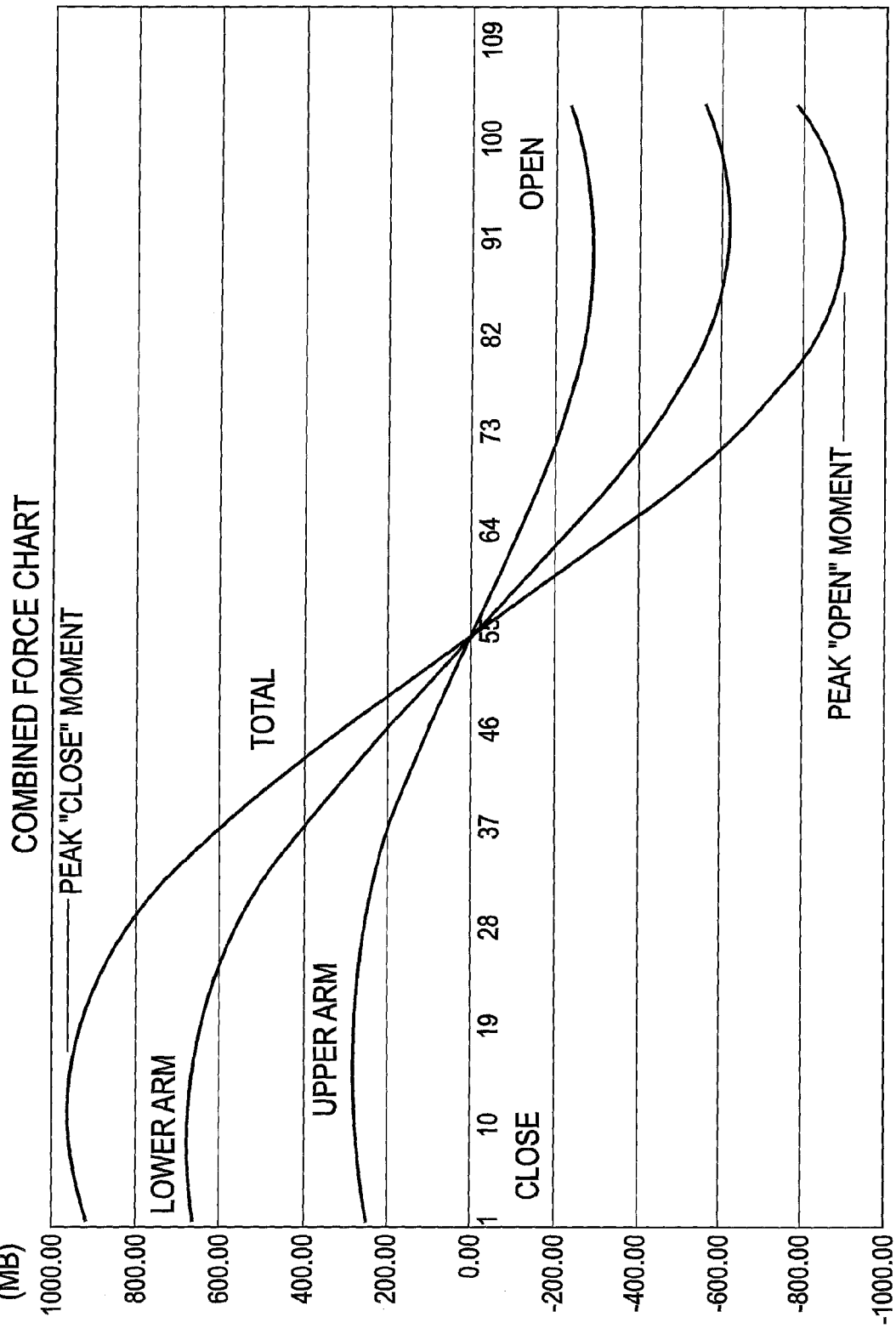

LINK-TYPE SLIDING DOOR MECHANISM

The present application is a continuation-in-part of U.S. patent application Ser. No. 12/851,669, filed Aug. 6, 2010.

BACKGROUND

Exemplary embodiments herein generally relate to a vehicle sliding door opening and closing mechanism for opening or closing a door associated with an opening of a vehicle body in a front-to-rear direction. More particularly, the present disclosure is directed to a link-type sliding door mechanism for opening and closing a door having an improved kinematic movement path.

With reference to FIGS. 1 and 2, a known sliding door opening and closing mechanism 100 for a vehicle includes lower and upper fixed arms 102,104 with a single pivot and a middle link 106. The middle link 106 can be operatively connected to a drive mechanism (not shown) for opening and closing a vehicle door 120. The vehicle door 120 can also be actuated manually through pulling on the door handle to open or close the door. Each of the lower and upper fixed arms 102,104 and the middle link 106 have a distal portion connected to the door 120 and a proximal portion operatively associated with respective lower, upper and middle guide tracks or rails 110,112,114 for slidably moving the vehicle door 120. Each guide track is attached to a vehicle side body structure 116 and extends in a front-to-rear direction of the side body structure. Generally, the lower guide rail 110 includes a rearward portion 124 and a forward portion 126, which is incorporated into the side body structure 116. Similarly, the upper guide rail 112 includes a rearward portion 128 and a forward portion 130.

To open the door 120, the drive mechanism is actuated causing the middle link 106 to translate along the side body structure 116 via the middle guide rail 114. Movement of the middle link 106 causes the lower and upper fixed arms 102, 104 to move along the lower and upper guide rails 110,112. The slide door is projected in a vehicle exterior direction along the curved portion 126 of the lower guide rail 110, and then the door is slidably moved to a fully opened position. In the fully opened position, a lower portion of the door is canted outwardly away from the side body structure 116. Conversely, to close the slide door 120, the door is moved toward the forward portion 126 along the rearward portion 124 of the lower guide rail 110, and then the door is pulled inward in a vehicle interior direction along the forward portion 126. This known opening and closing mechanism 100 achieves a lateral shift to the door position based on the lower and upper guide rails 124,126 that the lower and upper fixed arms 102,104 are guided by. As a result, due to the kinematic movement path of the door 120 (see FIG. 16), the vehicle body structure 116 is often compromised by the curved portion 126 of the lower guide rail 110 to accommodate the sliding door 120. The guide rail of this type disadvantageously influences the vehicle body structure. This compromised body structure can have open structural sections, rather than enclosed sections, and can suffer from poor continuity in the body structure where the opening and closing door mechanism 100 must be placed.

BRIEF DESCRIPTION

In accordance with one aspect, a sliding door mechanism for a vehicle is arranged to move a door from a door opening provided in a vehicle side body structure from a closed position to an open position. The sliding door mechanism comprises an upper slide rail and a lower slide rail fixed to the vehicle side body structure. An upper slider is associated with the upper rail and is movable along the upper rail, and a lower slider is associated with the lower rail and is movable along the lower rail. An upper link assembly operatively connected to the vehicle door and the upper slider, and a lower link assembly is operatively connected to the vehicle door and the lower slider. At least one link assembly of the upper link assembly and lower link assembly is configured to control a moment of force about a pivot axis while moving the vehicle door between the closed position and the open position. The moment of force is one of an opening moment and a closing moment and is dependent on a position of the vehicle door relative to the vehicle side body structure. The at least one link assembly is configured such that the moment of force is substantially zero between when the vehicle door moves between the closed position and the open position.

In accordance with another aspect, a sliding door mechanism for a vehicle is arranged to laterally displace a door from a door opening provided in a vehicle side body structure and translate the door along the vehicle side body structure to an open position. The sliding door mechanism comprises an upper guide rail and a lower guide rail, each of the guide rails being attached to the vehicle side body structure. An upper four-bar link assembly is operatively connected to the upper guide rail and the vehicle sliding door. A lower four-bar link assembly is operatively connected to the lower guide rail and the vehicle sliding door. Each of the upper and lower four-bar link assemblies is configured to modulate a closing moment of force and an opening moment of force throughout initial displacement of the vehicle door from the vehicle body structure, and provides for a zero moment position as the moment of force changes from one of closing and opening moment to the other of the closing and opening moment.

In accordance with yet another aspect, a sliding door mechanism for a vehicle is arranged to move a door from a door opening provided in a vehicle side body structure from a closed position to an open position. The sliding door mechanism comprises an upper slide rail and a lower slide rail fixed to the vehicle side body structure. An upper slider is associated with the upper rail and is movable along the upper rail. A lower slider is associated with the lower rail and is movable along the lower rail. An upper link assembly is operatively connected to the vehicle door and the upper slider, and a lower link assembly is operatively connected to the vehicle door and the lower slider. Each of the upper and lower link assemblies is a four-bar linkage including a bracket fixed to the vehicle door and defining a fixed link, an input link, a coupler link and an output link. The input link has a proximal portion pivotally connected to the slider to define an inside pivot and a distal portion pivotally connected to the bracket to define an outside pivot. The coupler link has a proximal portion and a distal portion and is pivotally connected to the input link. The coupler link intersects the input link. The output link has a proximal portion pivotally connected to the distal portion of the coupler link to define an inside pivot and a distal portion pivotally connected to the bracket to define an outside pivot. A biasing member connected between the input link and the coupler link drives the coupler link in one direction as the input link move in an opposite direction as the vehicle door is moved between the closed position and the open position. Each of the upper link assembly and lower link assembly is configured to vary a moment of force between a closing moment of force and opening moment of force associated with the movement of the vehicle door between the closed position and the open position. Each of the upper link assembly and lower link assembly is configured such that the moment of force is substantially zero between when the vehicle door moves between the closed position and the open position.

BRIEF DESCRIPTION OF THE DRAWINGS

FIG. 33 graphically illustrates the moments of force for both the lower link assembly and the upper link assembly in the various positions shown in FIGS. 21-26.

DETAILED DESCRIPTION

Figure 1:
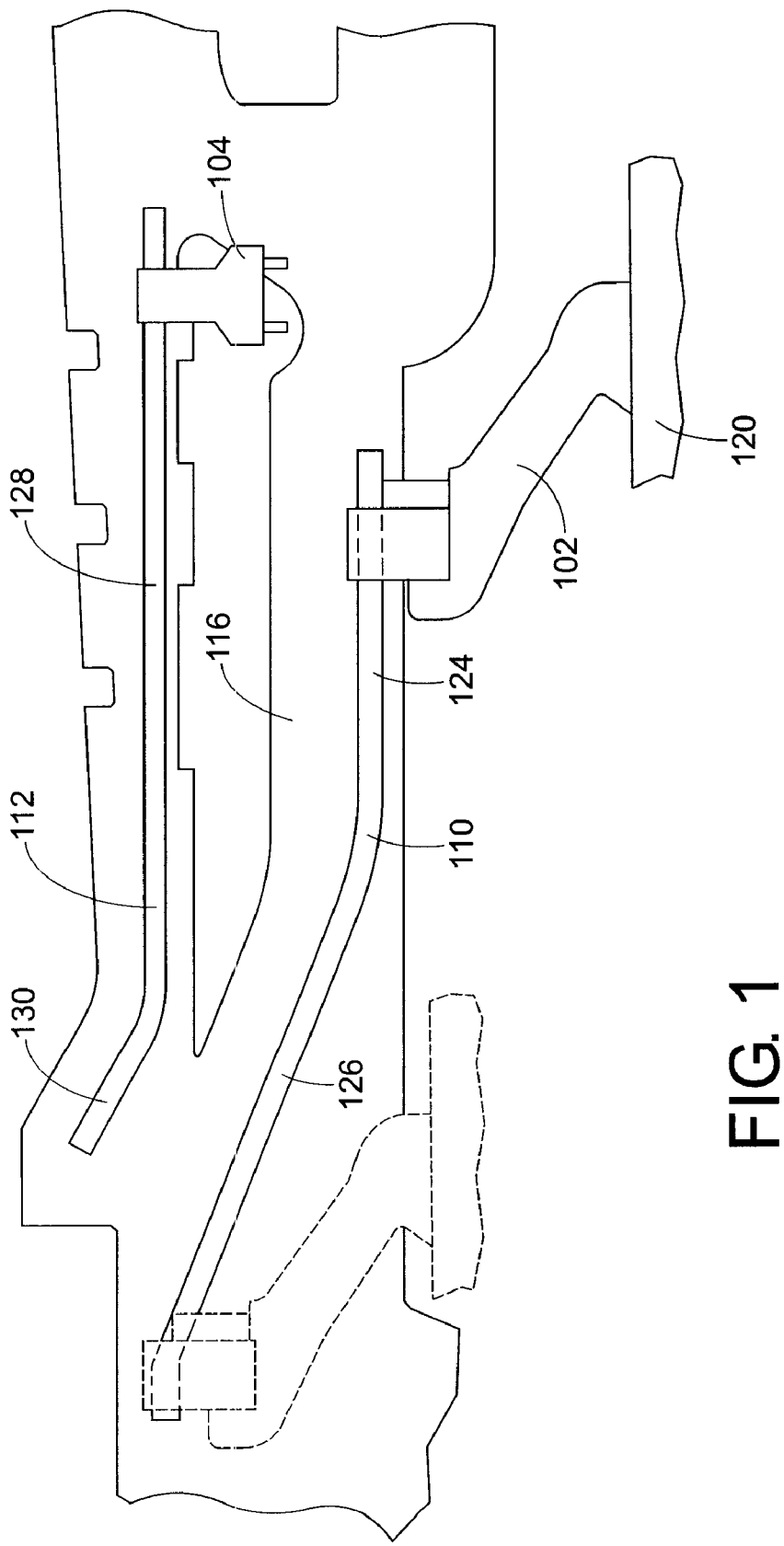
FIG. 1 is a partial schematic of a known sliding door opening and closing mechanism for a vehicle including lower and upper sliding assemblies with lower and upper fixed arms with a single pivot.
Figure 2:
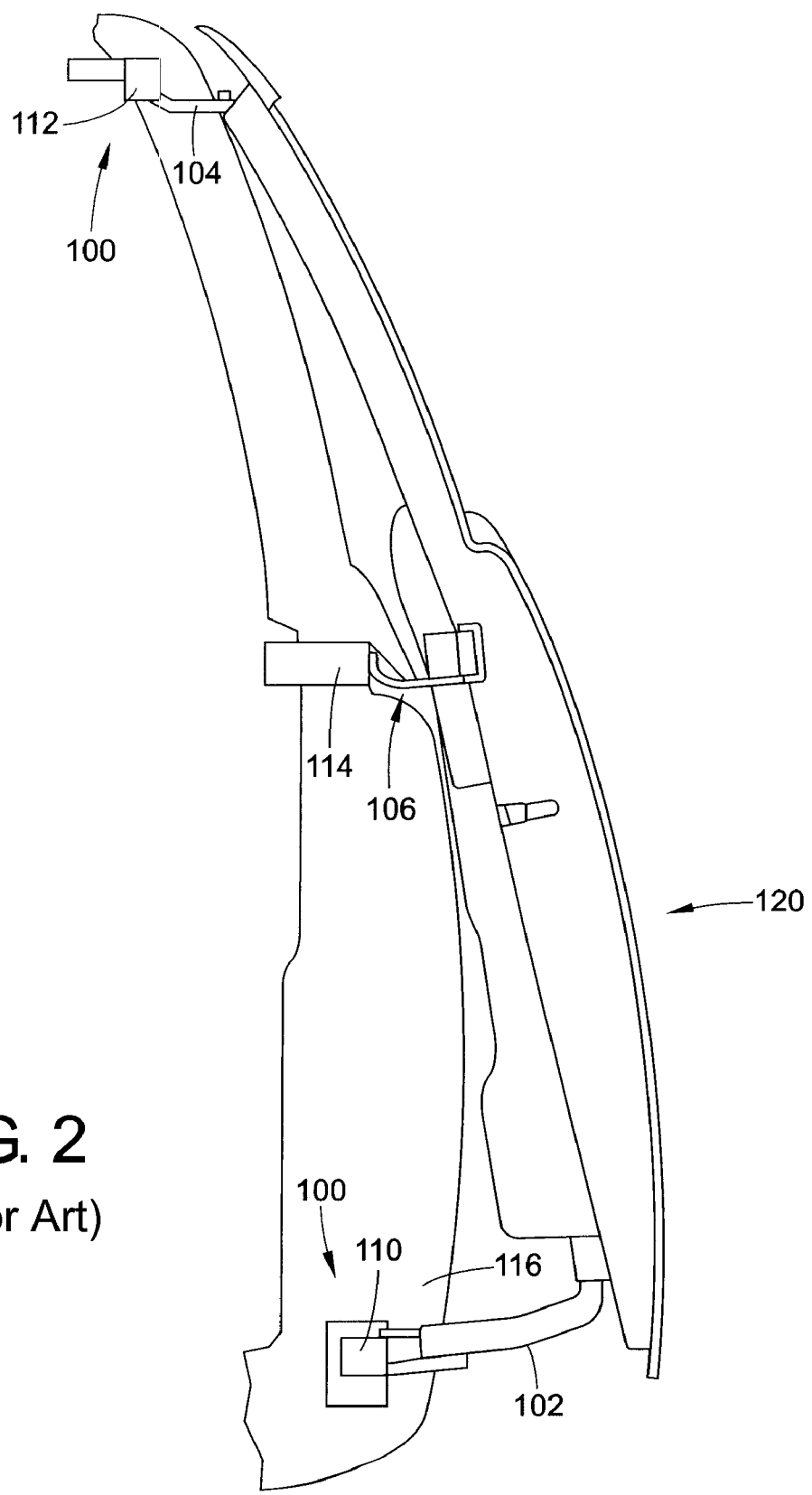
FIG. 2 is a schematic view of the vehicle door of FIG. 1 in an open position, a lower portion of the door being canted outwardly.
Figure 3:
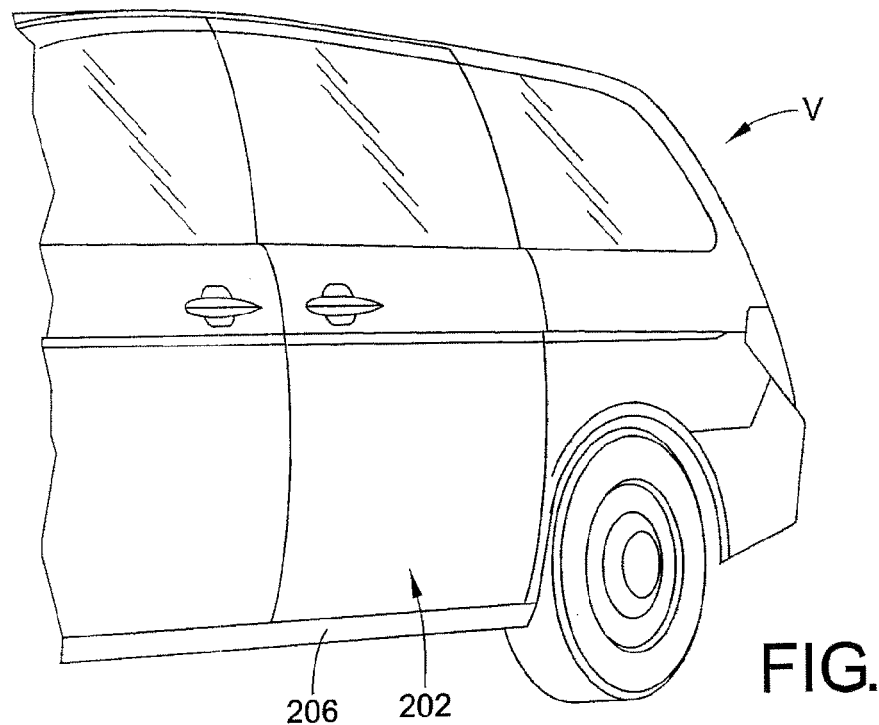
FIGS. 3 and 4 are side schematic views of a vehicle having sliding door moveable between a closed position and open position via an exemplary sliding door mechanism according to one aspect the present disclosure, in the closed position the door generally fits flush with the adjacent vehicle outer body structure of the vehicle, in the open position door is laterally displaced from the body structure.

It should, of course, be understood that the description and drawings herein are merely illustrative and that various modifications and changes can be made in the structures disclosed without departing from the present disclosure. It will also be appreciated that the various identified components of the exemplary sliding door mechanism disclosed herein are merely terms of art that may vary from one manufacturer to another and should not be deemed to limit the present disclosure.

Referring now to the drawings, wherein like numerals refer to like parts throughout the several views, FIGS. 3-6 illustrate an exemplary sliding door mechanism 200 for a vehicle V according to the present disclosure. The sliding door mechanism 200 is associated with the middle link 106, which can be operatively connected to the drive mechanism (not shown) for opening and closing a vehicle door 202 in a front-to-rear direction of a vehicle side body structure 206. The vehicle door 202 can also be actuated manually through pulling on the door handle to open or close the door. The sliding door mechanism 200 is arranged to move or displace the vehicle door 202 from a closed position where the door generally lies in a first plane of a door opening 204 provided in the vehicle side body structure 206 into a second plane arranged laterally from and approximately parallel to the door plane and to slide the door in the second plane to an open position.

Figure 4:
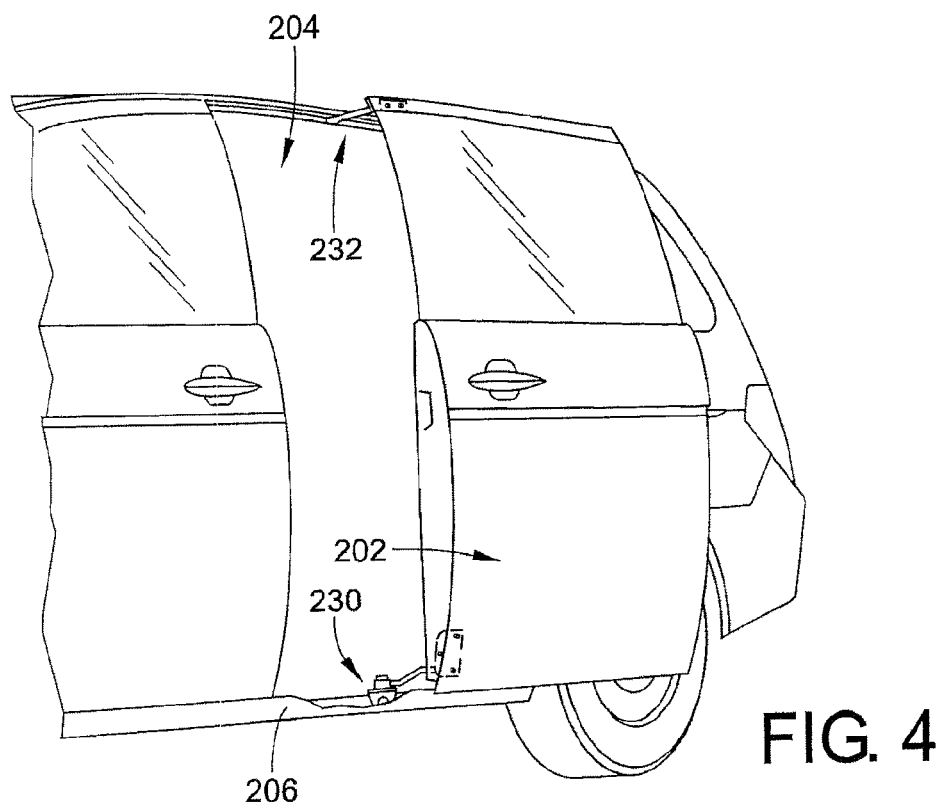
Figure 5:
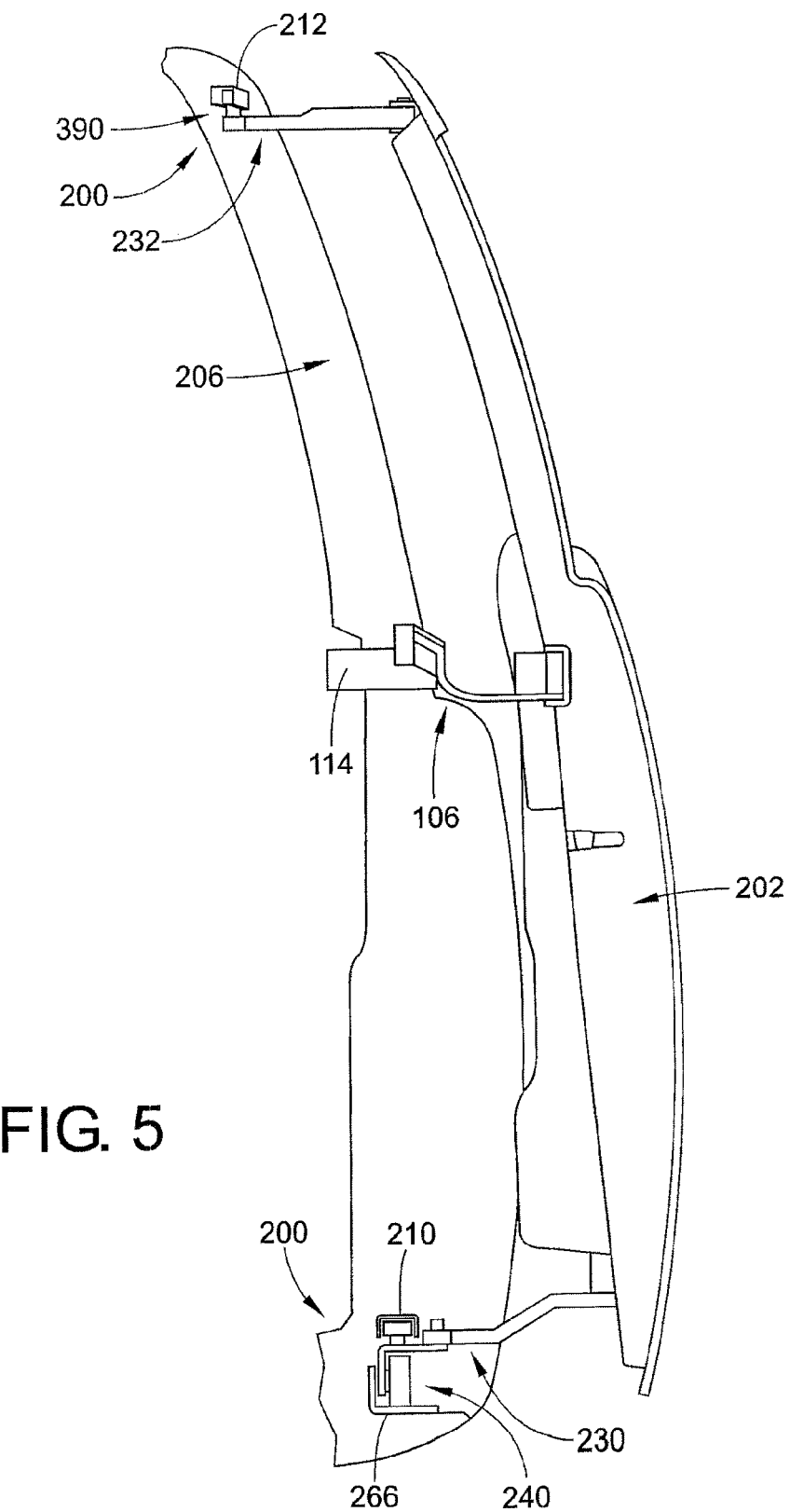
FIG. 5 is a schematic view of the vehicle door of FIG. 4.
Figure 7:
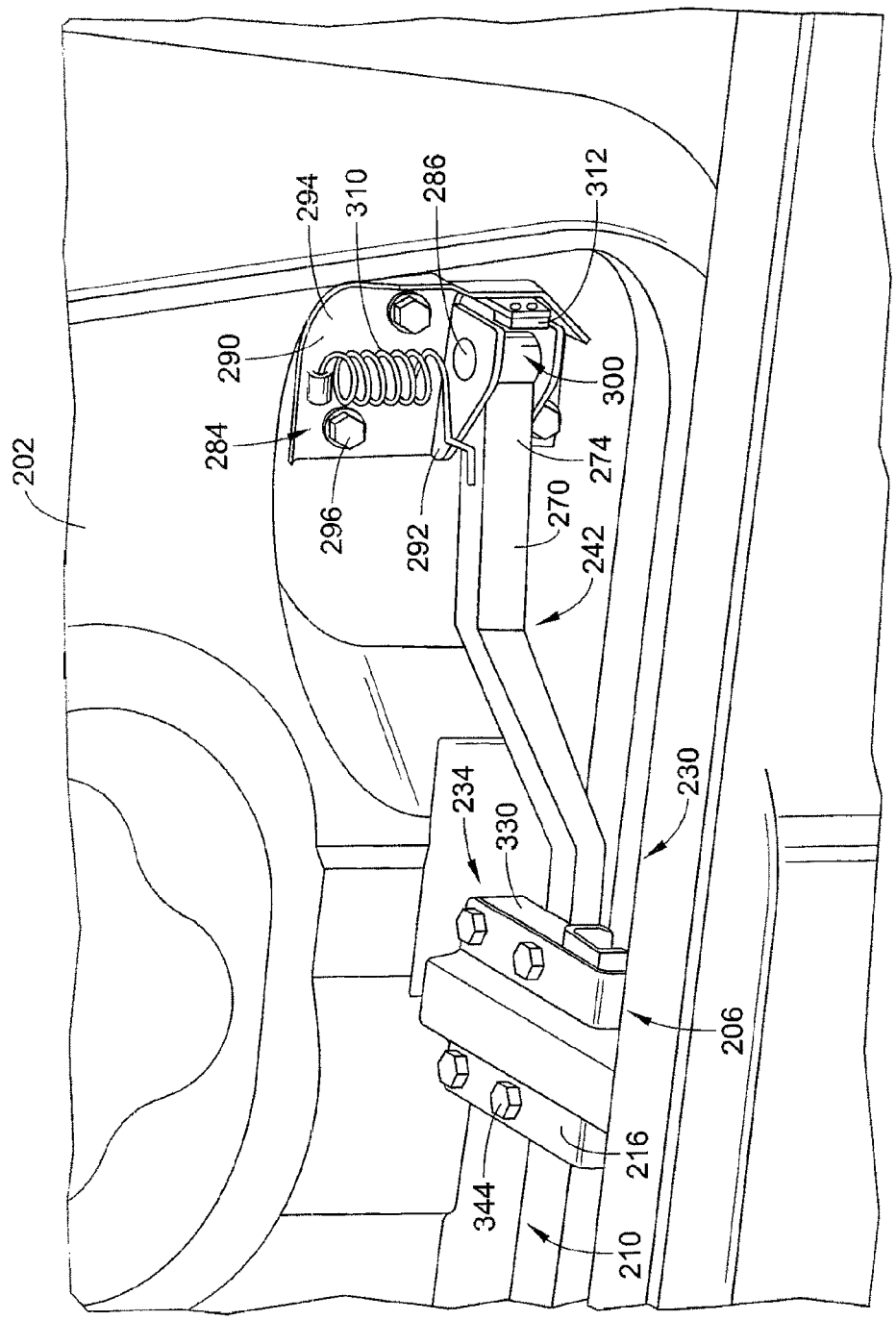
FIG. 7 is an inside perspective view of a lower sliding assembly of the exemplary sliding door mechanism of FIG. 6, the vehicle door being in the closed position.

The sliding door mechanism 200 generally comprises a lower slide rail 210 and an upper slide rail 212. Each slide rail extends in a front-to-rear direction of the vehicle side body structure 206 and is fixed to the side body structure. For example, the lower slide rail 210 is fixed to a lower side sill member 214 via support brackets 216,218,220 and the upper slide rail is fixed to an upper side sill member 222. Each of the lower and upper slide rails are appropriately shaped such that each slide rail generally conforms to the vehicle side body structure 206 so that no portion of each slide rail intrudes into the vehicle side body structure. For example, the lower slide rail 210 does not cross over to an inboard lateral side of the lower side sill member 214. Each slide rail 210,212 is disposed on an outboard lateral side of the respective side sill members 214,222. A lower sliding assembly 230 is operatively associated with the lower rail 210 and is movable along the lower rail. An upper sliding assembly 232 is operatively associated with the upper rail 212 and is movable along the upper rail. The lower and upper sliding assemblies 230,232 guide the vehicle door 202 in the front-to-rear direction. With reference to FIG. 7, a control mechanism 234 is operatively associated with a selected one of the lower and upper sliding assembly 230,232. In the depicted exemplary embodiment, the control mechanism is associated with the lower sliding assembly. In the illustrated embodiment, the control mechanism 234 controls rotation of the lower and upper assemblies 230,232 to laterally displace the vehicle door 202 from the vehicle side body structure 206 and translation of the lower and upper sliding assemblies to slide the vehicle door along the vehicle side body structure. As shown in FIGS. 4 and 5, the sliding door mechanism 200 maintains the vehicle door 202 in substantially the same orientation during both laterally and longitudinally movement as the orientation of the vehicle door in the closed position.

Figure 8:
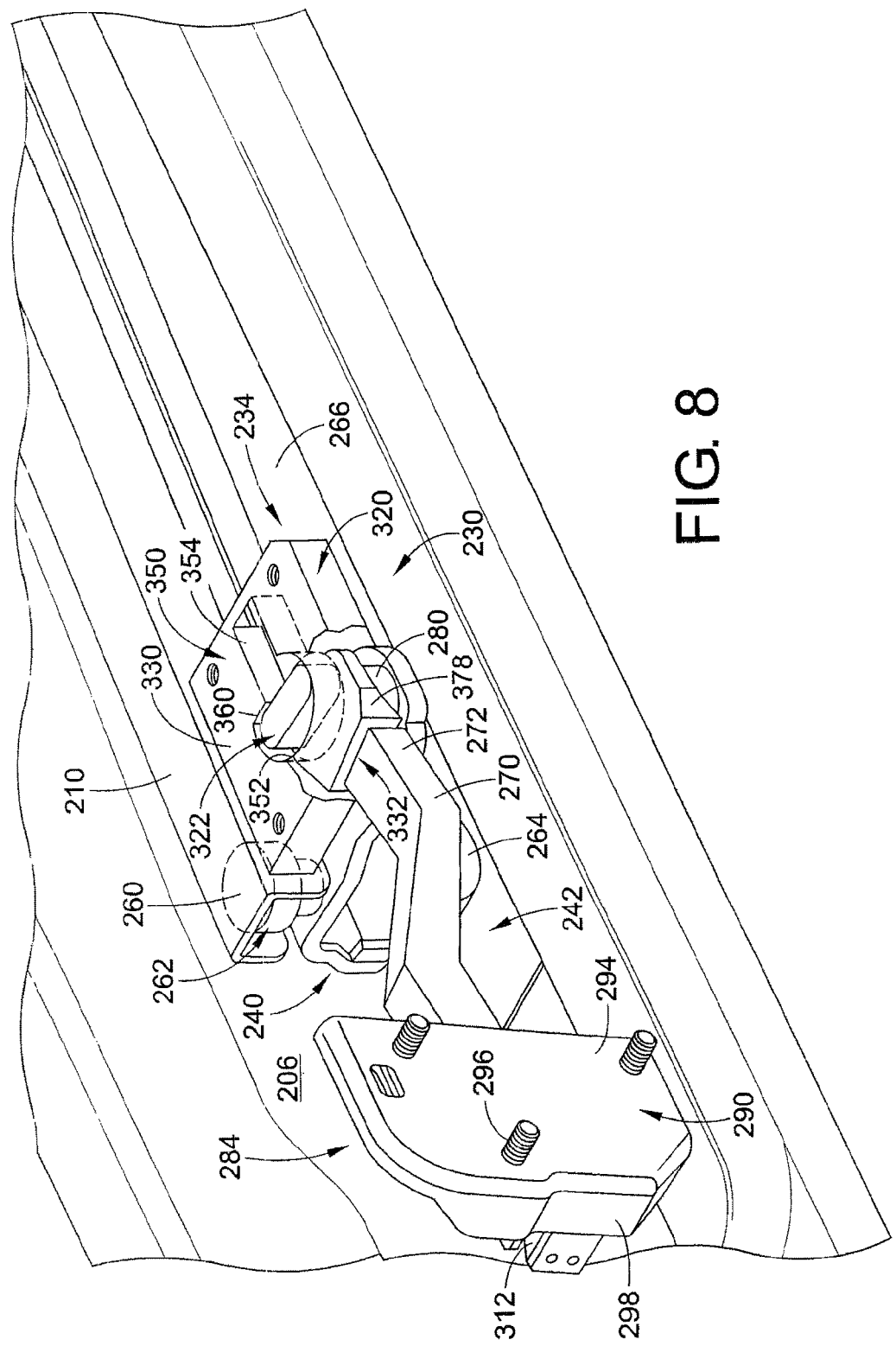
FIG. 8 is an outside perspective view of the lower sliding assembly of FIG. 7.
Figure 9:
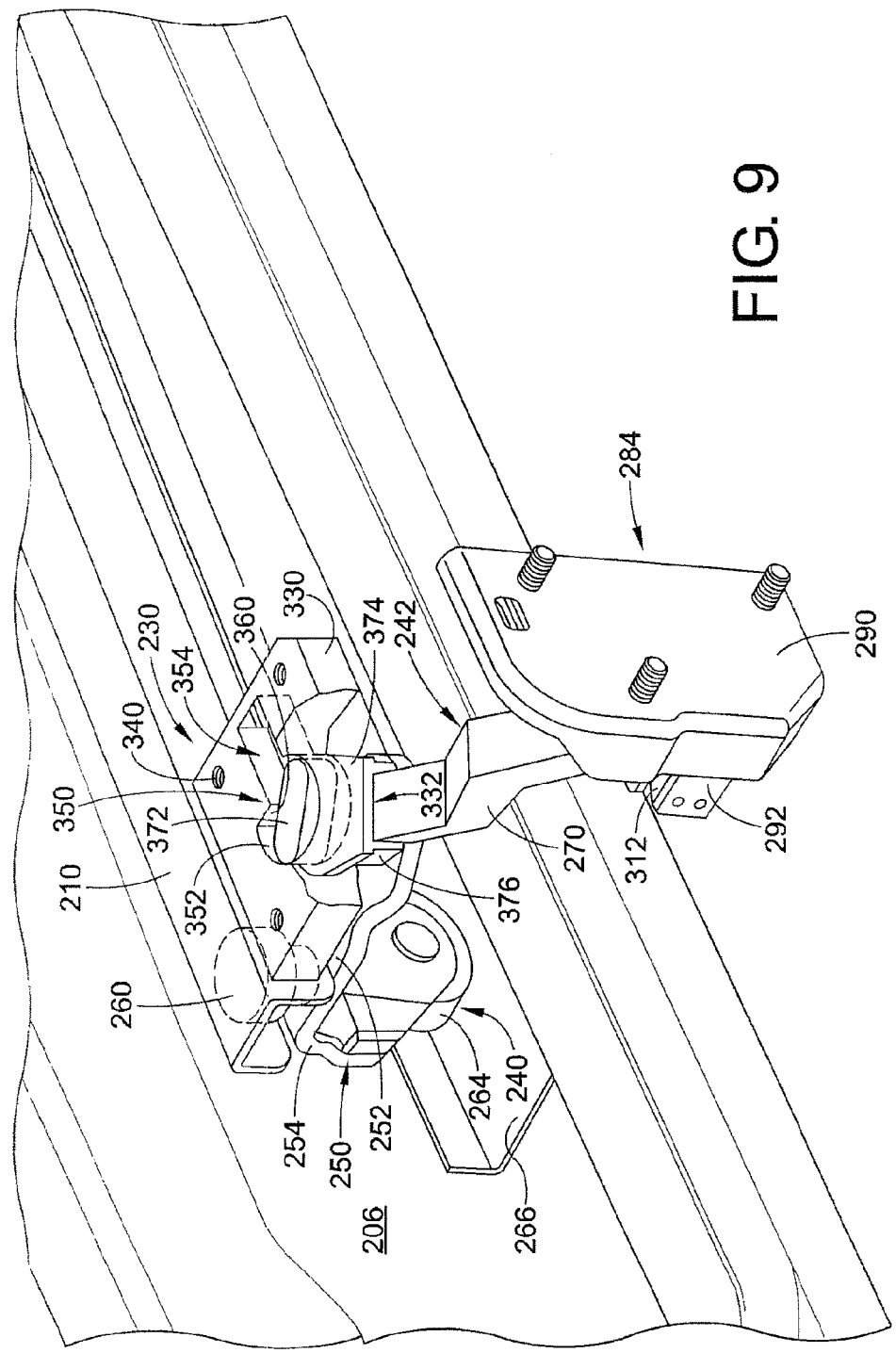
FIG. 9 is a perspective view of the lower sliding assembly of FIG. 8 as the vehicle door is being laterally displaced.
Figure 10:
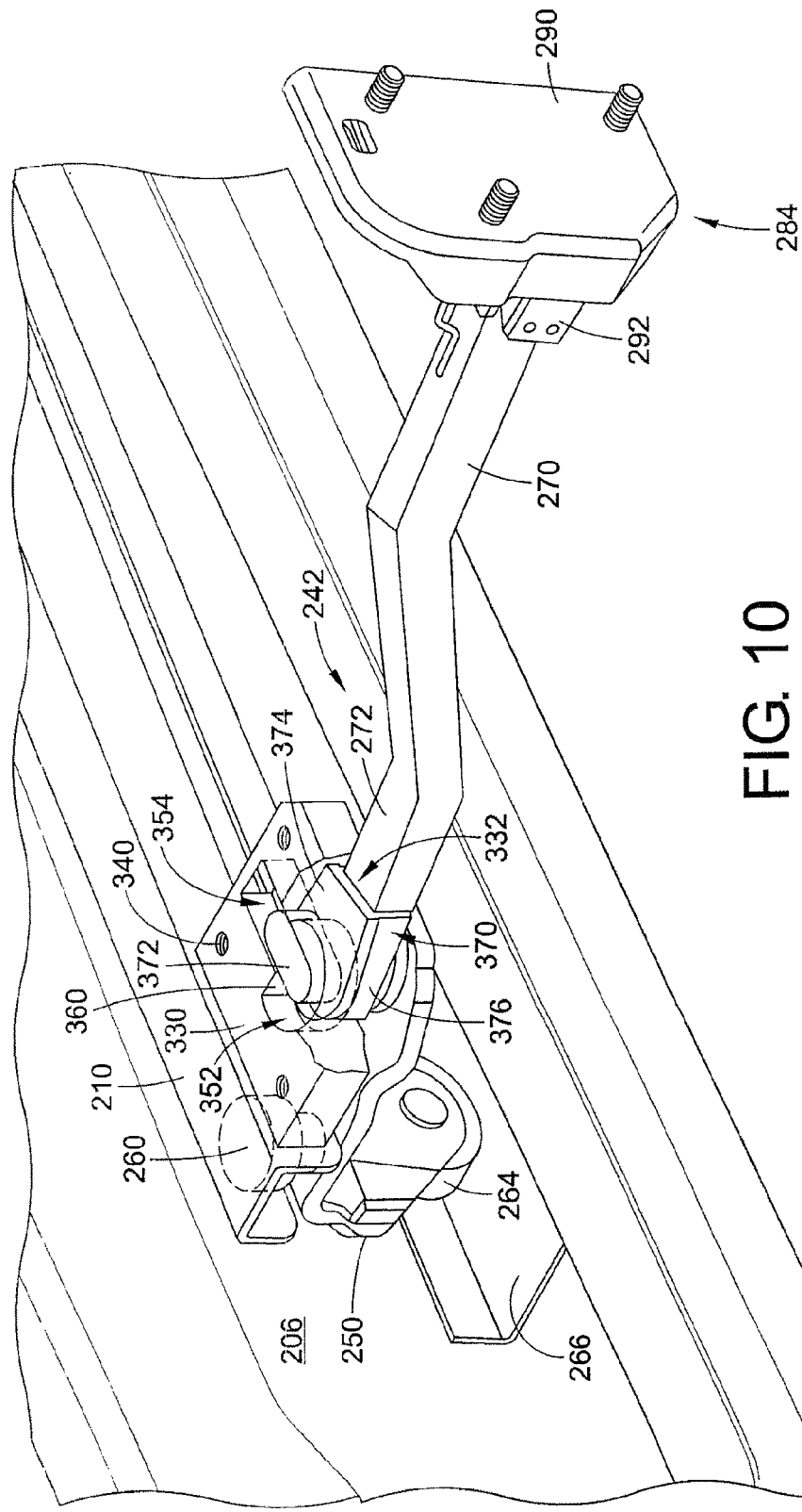
FIGS. 10 and 11 are perspective views of the lower sliding assembly of FIG. 8 as the vehicle door is being moved to the open position.

With reference to FIGS. 7 and 8, the lower sliding assembly 230 includes a lower slider 240 associated with the lower rail 210 and movable along the lower rail and a lower link 242. As seen in FIG. 9, the lower slider 240 generally includes a body 250 having a base 252 and a flange 254 extending downwardly from one (inboard) side of the base. A first roller member or wheel 260 is connected to the base 252 and is received in an elongated channel 262 defined by the lower rail 210. The first wheel 260 rotates about a generally vertical axis. A second roller member or wheel 264 is connected to the flange 254 and is movable along a track 266 that is fixed to the vehicle body structure 206. The second wheel 264 rotates about a generally horizontal axis. The roller members allow sliding movement of the lower slider along the lower rail as the vehicle door 202 is moving between the closed and open positions, and vice versa.

The lower link 242 includes a control arm 270 operatively connected to the lower guide rail 210. The control arm has a first end portion or proximal portion 272 (FIG. 8) and a second end portion or distal portion 274 (FIG. 7), which is slightly elevated relative to the proximal portion. The proximal portion 272 is pivotally connected to the lower slider 240 to define an inside pivot and the distal portion 274 is pivotally connected to the vehicle door 202 to define an outside pivot. Particularly, in the depicted exemplary embodiment, the proximal portion 272 is connected to the base 252 via a first pivot pin 280 and the distal portion 274 is connected to a bracket assembly 284 via a second pivot pin 286.

As shown in FIG. 7, the bracket assembly 284 is pivotally secured to a body structure of the vehicle door 202 and includes a first bracket member 290 and a second bracket member 292. The first bracket member 290 includes a base wall 294 that is fixed to the vehicle door 202 via fasteners, such as the illustrated bolts 296, and a side wall member 298. The second bracket member 292 is generally U-shaped and defines a channel 300 for receiving the distal portion 274 of the control arm 270 of the lower link 242. A spring 310 is associated with the distal portion 274 (i.e., the outer pivot) and the bracket assembly 284 for maintaining proper orientation of the lower link 242 during overall kinematic movement of the lower link. As depicted, the spring 310 is connected to the first bracket member 290 and a longitudinal axis of the spring is generally perpendicular to a longitudinal axis of the control arm 270. The spring 310 provides a predetermined force to maintain the vehicle door in one of the open and closed positions. A zero force of the spring 310 is the point where the control arm 270 is transitioning between rotation and translation. A stopper 312 is provided on one of the bracket assembly and the distal portion of the control arm to positively control the final rotational orientation or open angle of the lower link 242 (i.e., the position of the lower link during translational movement of the vehicle door along the vehicle body particularly when the door is at the rear most position). In the depicted embodiment, the stopper is connected to the second bracket member 292.

As indicated previously, according to one exemplary aspect, the control mechanism 234 is associated with the lower sliding assembly 230 and includes a first control 320 and a second control 322. The first control 320 is fixed to the vehicle side body structure 206 and operatively associated with the proximal portion 272 of the control arm of the lower link 242. The second control 322 is fixed to the proximal portion 272 of the control arm 270. As will be described in greater detail below, movement of the second control is generally based on predetermined structural constraints associated with the first control.

With reference to FIGS. 7-10, the first control 320 includes a housing 330 which houses the inside pivot of the control arm 270. The second control 322 includes a cam 332 provided at the inside pivot and operatively supported within the housing. The housing 330 is fixedly connected to the lower rail 210 via the support bracket 216. To mount the housing to the support bracket, the housing includes threaded apertures 340 which are in registry with openings (not shown) located in the support bracket. Fasteners, such as bolts 342, extend through the openings and threadenly engage the apertures 340. Although, alternative manners for securing the housing 330 to the support bracket 216 are contemplated. It should also be appreciated that the support bracket and housing can be a unitary member. The housing 330 is configured to rotatably and slidably receive the proximal portion 272 of the control arm 270. Particularly, the structural constraints of the housing 330 includes an opening 350 shaped to allow for both rotation and translation of the cam 332. In the exemplary embodiment of the housing 330, the opening 350 is generally key-shaped and includes a first opening portion 352 and an elongated second opening portion 354. A stop 360 is associated with one of the first and second opening portion 352,354 to stop rotation of the cam 332 at a predetermined position (i.e. alignment of the cam with a longitudinal axis of the second opening, FIG. 10) within the housing 330.

Figure 6:
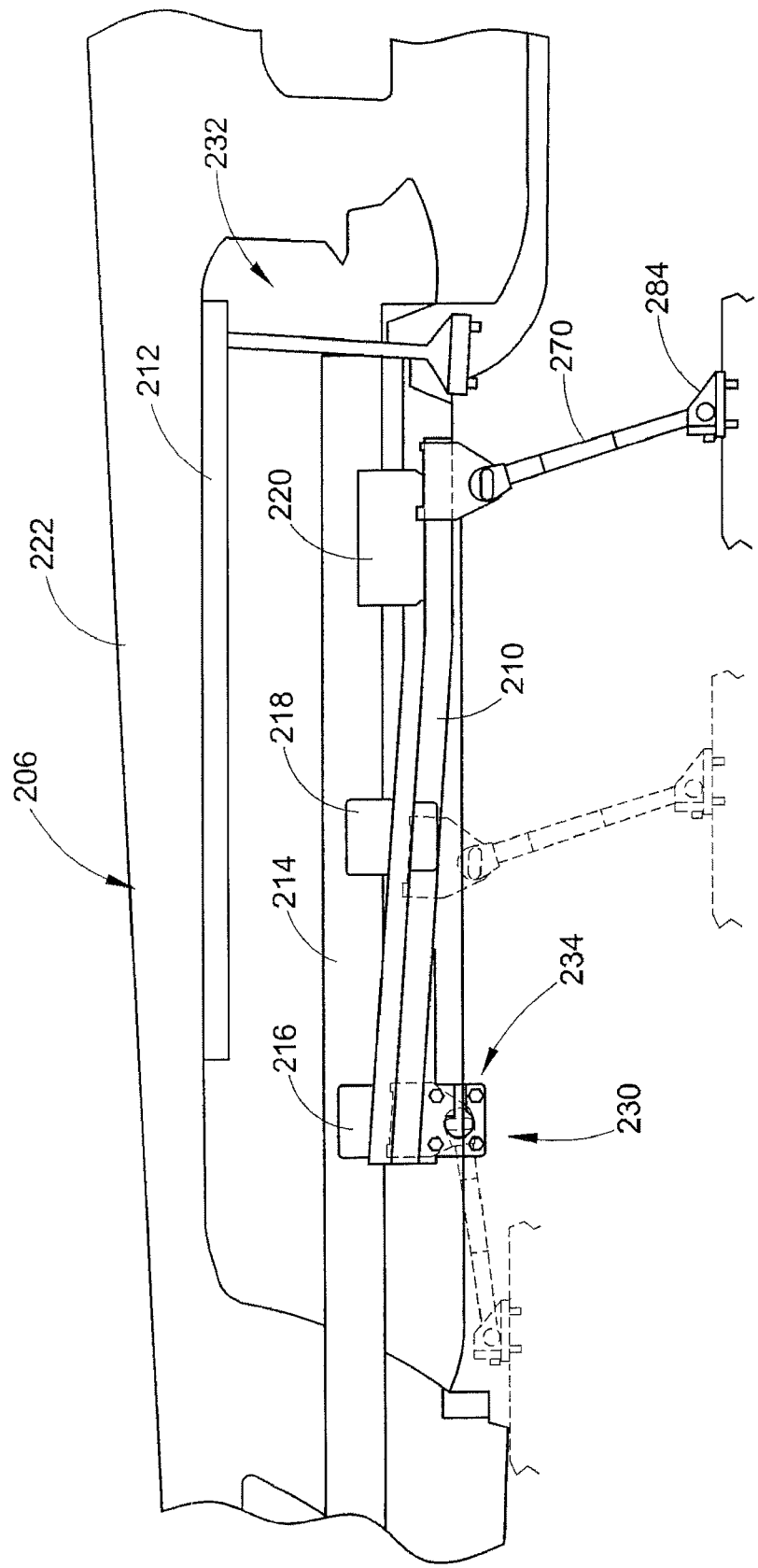
FIG. 6 is illustrates the exemplary sliding door mechanism in various positions including the closed position, the open position and an intermediate position therebetween.
Figure 11:
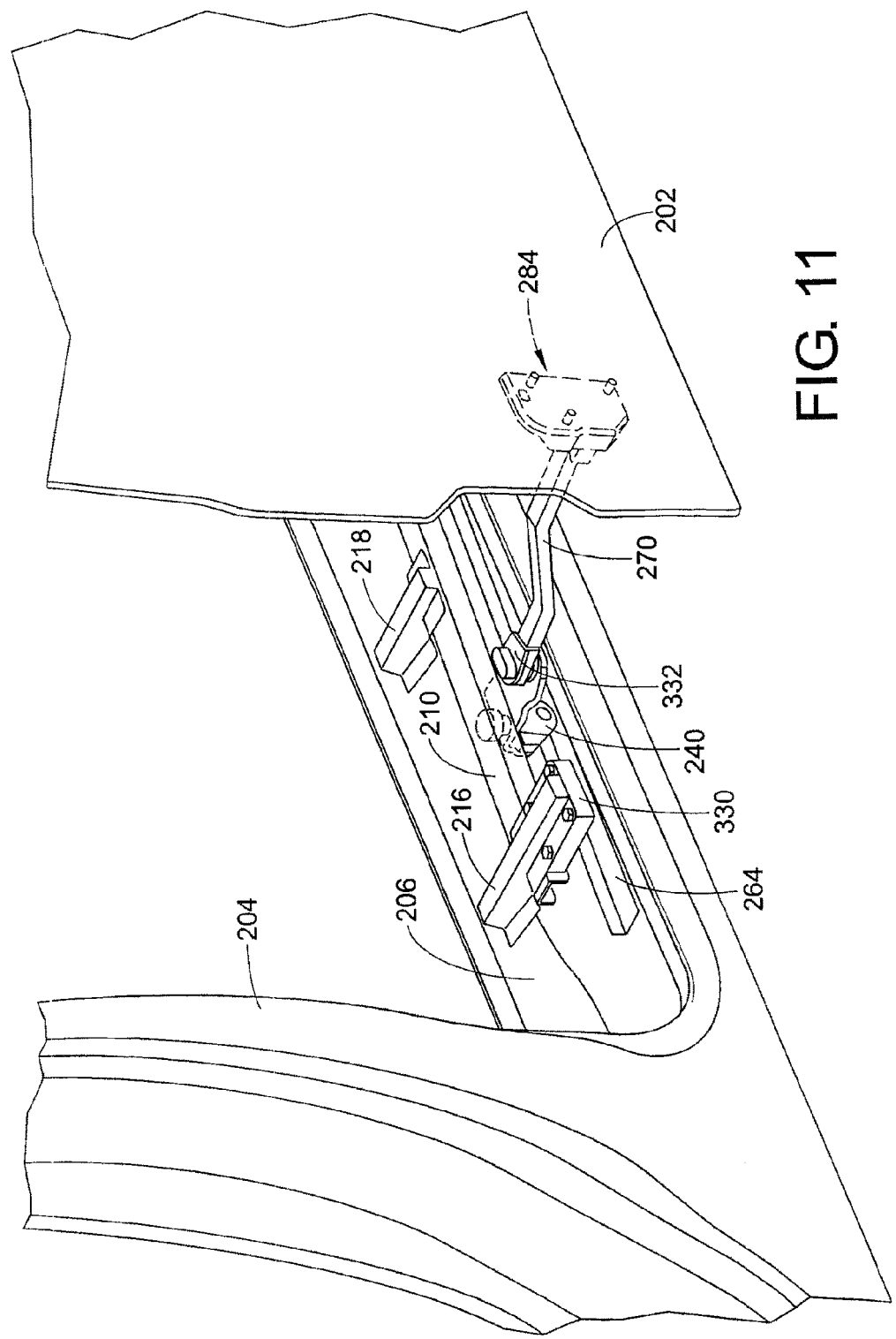

The cam 332 controls the rotation and translation of the control arm 270 based on the constraints within the housing 330 and has a first orientation within the first opening portion 352 when vehicle door 202 is in the closed position and rotates to a second orientation as the vehicle door is displaced laterally from the vehicle body structure. The cam 332 maintains the second orientation and moves with the lower link 242 as the vehicle door 202 slides along the vehicle body structure 206 to the open position (FIG. 6). The cam 332 comprises a body 370 and a generally obround guide member 372. The body 370 includes a base 374 and a pair of side walls 376,378 extending downwardly from the base. The base and side walls together define a slotted opening (not shown) dimensioned to securely receive the proximal portion 372 of the control arm 370. The guide member 372 is located on the base 374 and is operatively positioned in the housing opening 350. According to the depicted exemplary embodiment, to allow for the movement of the cam within the housing 330, the first opening portion 352 has a diameter slighter greater than a longitudinal length of the guide member 372 which allows for partial rotation of the guide member within the first opening portion 352 (FIGS. 8 and 9). The inner pivot axis of the control arm 270 defines a center axis of the first opening portion. The second opening portion 354 has a width slightly greater than a width of the guide member 372 which allows for translation of the guide member within the second opening portion 354 and out of the housing 330 (FIG. 11). According to one aspect, during movement of the cam 332 within the opening 350, an outer surface of the guide member 372 is in continuous contact with an inner surface of the housing which defines the opening 350. This yields a stable door movement condition that maintains all door opening and clearance requirements.

With reference now to FIGS. 12-15, the upper sliding assembly 232 includes an upper slider 390 associated with the upper rail 212 and movable along the upper rail and an upper link 392. The upper slider 390 generally includes a roller member or wheel 396 that is received in an elongated channel 398 defined by the upper rail 212. The roller member 396 allow sliding movement of the upper slider along the upper rail as the vehicle door 202 is moving between the closed and open positions. The upper link 392 is generally controlled by the control mechanism 234 operatively associated with the lower link 242 and serves as a guide for movement of the vehicle door 202. The upper link 392 includes a control arm 400 operatively connected to the upper guide rail 212. The control arm has a first end portion or proximal portion 402 and a second end portion or distal portion 404. The proximal portion 402 is pivotally connected to the upper slider 390 to define an inside pivot and the distal portion 404 is pivotally connected to the vehicle door 202 to define an outside pivot. Particularly, in the depicted exemplary embodiment, the proximal portion 402 is connected to the wheel 396 via a first pivot pin 410 and the distal portion 404 is connected to a bracket assembly 414 via a second pivot pin 416.

Figure 12:
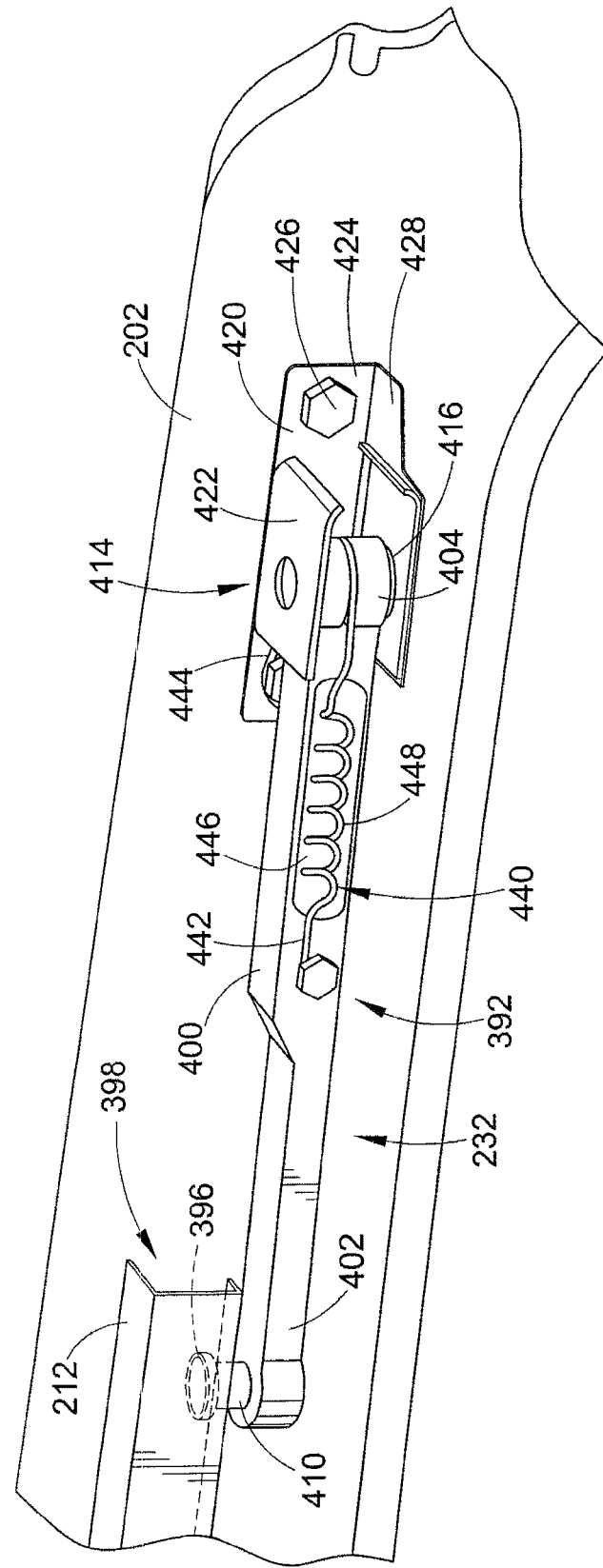
FIG. 12 is an inside perspective view of an upper sliding assembly of the exemplary sliding door mechanism of FIG. 6, the vehicle door being in the closed position.
Figure 13:
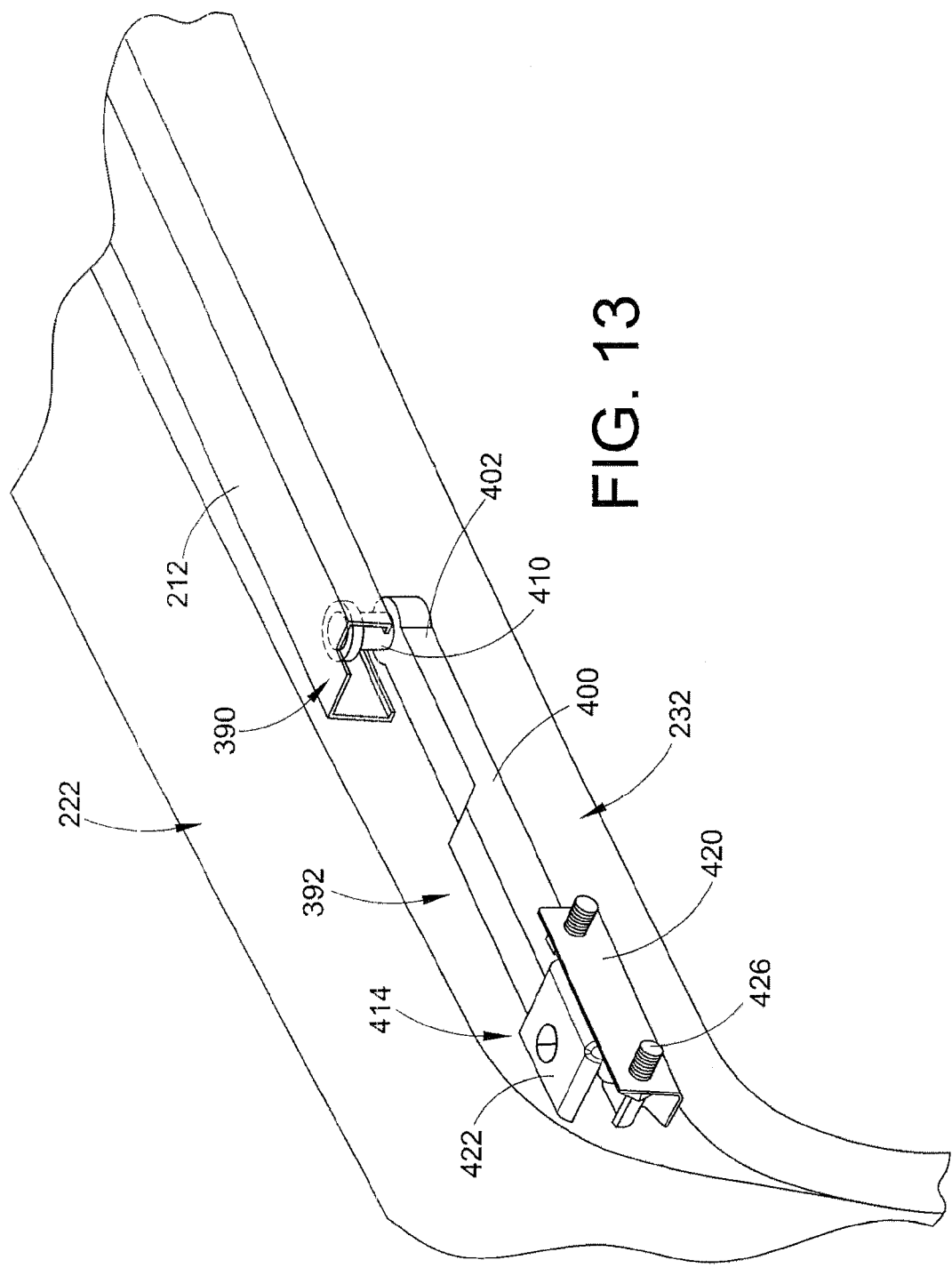
FIG. 13 is an outside perspective view of the upper sliding assembly of FIG. 12.
Figure 14:
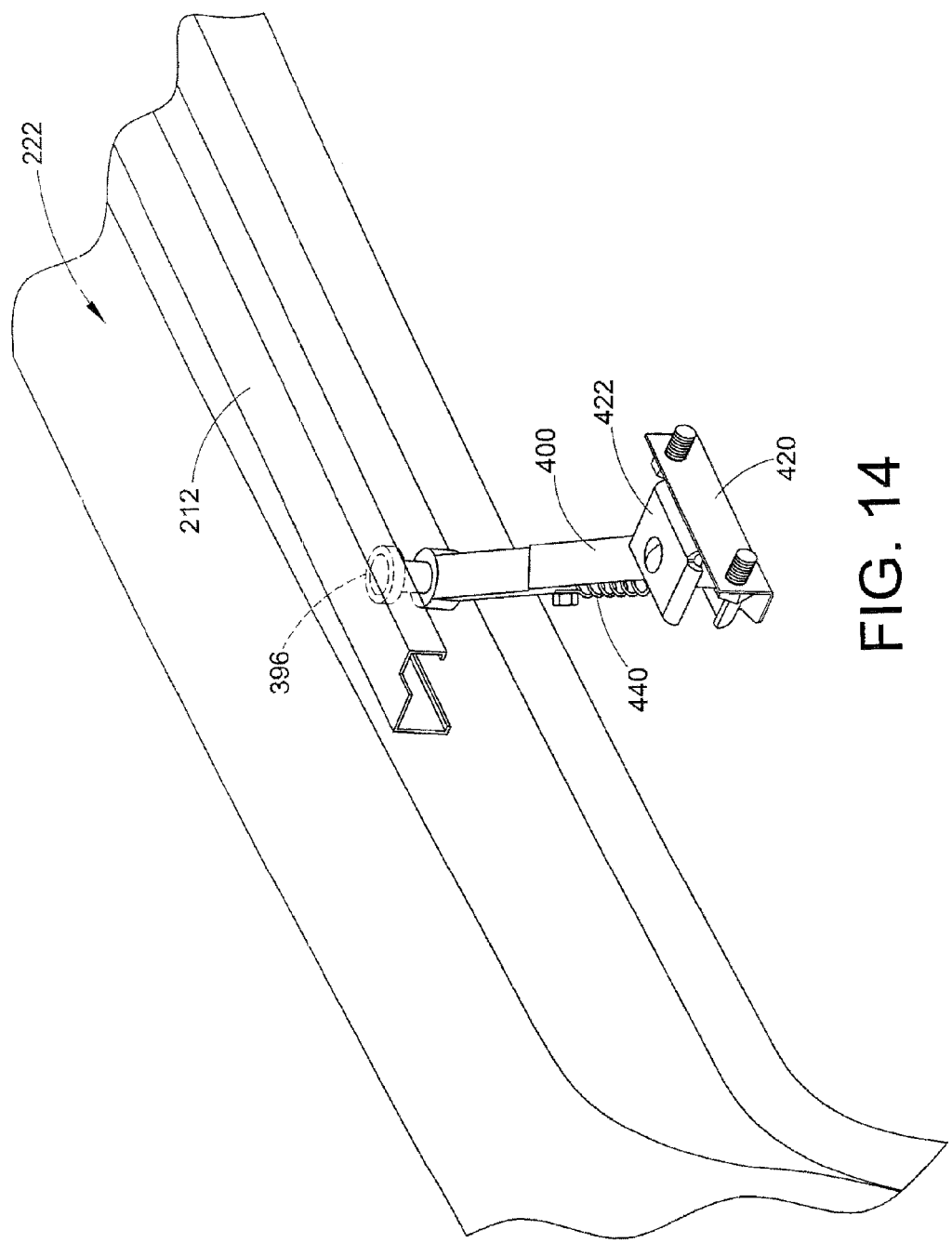
FIGS. 14 and 15 are perspective views of the upper sliding assembly of FIG. 13 as the vehicle door is being moved to the open position.
Figure 15:
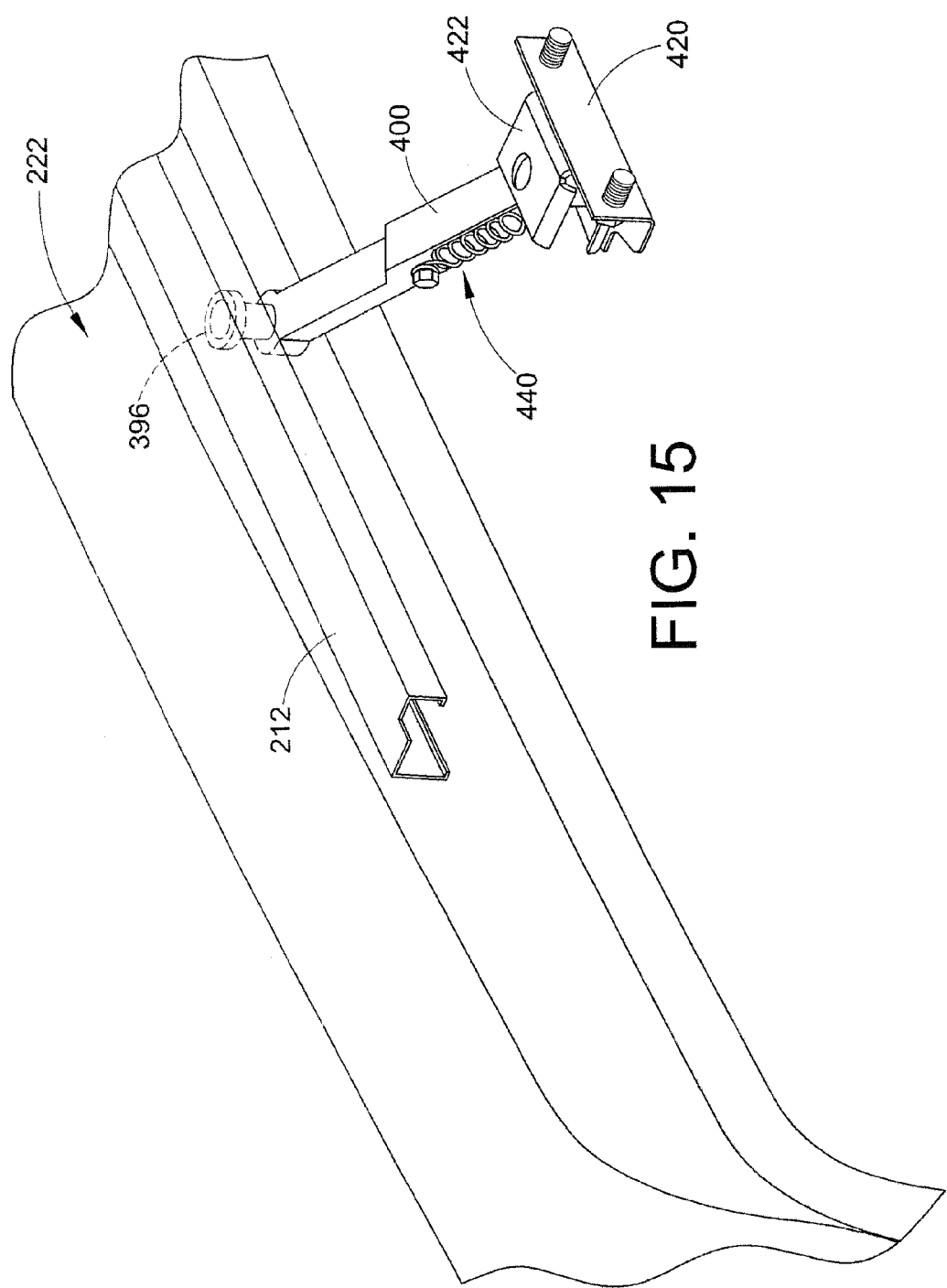

As shown in FIG. 12, the bracket assembly 414 is secured to a body structure of the vehicle door 202 and includes a first bracket member 420 and a second bracket member 422. The first bracket member 420 includes a base wall 424 that is fixed to the vehicle door 202 via fasteners, such as the illustrated bolts 426, and a side wall member 428. The second bracket member 422 is generally U-shaped and is sized to receive the distal portion 404 of the control arm 400 of the upper link 392. Similar to the lower link 242, a spring 440 is associated with the distal portion 404 (i.e., the outer pivot) and the bracket assembly 414 for maintaining proper orientation of the upper link 392 during overall kinematic movement of the upper link. As depicted, a first end 442 of the spring 440 is secured to the control arm 400 and a second end 444 of the spring is wound around the distal portion 404 and is secured to one of the bolts 426. The control arm further includes an elongated slot 446 for receiving the spring coil 448. Thus, a longitudinal axis of the spring 440 is generally parallel to a longitudinal axis of the control arm 400. The spring 440 provides a predetermined force to maintain the vehicle door in one of the open and closed position, and a zero force of the spring 440 is the point where the control arm 400 is transitioning between rotation and translation.

As is evident form the foregoing, the sliding door mechanism 200 for the vehicle is arranged to laterally displace the vehicle door 202 from the door opening 204 provided in the vehicle side body structure 206 and translate the door along the vehicle side body structure to the open position. The sliding door mechanism 200 comprises the lower guide rail 210 and the upper guide rail 212. Each of the upper and lower guide rails is attached to the vehicle side body structure 206 and is appropriately shaped so that no portion of the lower and upper guide rails 210,212 intrude into the vehicle side body structure. The lower link 242 includes the control arm 270 operatively connected to the lower guide rail 210 and the vehicle sliding door 202. The upper link 392 includes the control arm 400 operatively connected to the upper guide rail 212 and to the vehicle sliding door. The control mechanism 234 is connected to the vehicle side body structure 206 and is operatively associated with the lower link 242. The control mechanism 234 includes the fixed housing 330 and the cam 332 operatively supported within the housing. The cam 332 controls a stop point of the vehicle door by movement into the housing. The cam 332 is configured to at least partially rotate within the housing, which moves the door 202 laterally away from the vehicle body 206. The cam 332 then aligns with the opening 350 in the housing 330 which allows the cam to move out of the housing, which longitudinally moves the door along the vehicle body. The vehicle door maintains substantially the same orientation during opening (movement laterally and longitudinally) as the door in the closed position.

To open the vehicle door 202, the drive mechanism (not shown) can be actuated causing the middle link 106 (FIG. 5) to translate along the vehicle side body structure 206 via the middle guide rail 114 in a front-to-rear direction. Again, in a manual mode, the vehicle door can be actuated through pulling on the door handle. Movement of the middle link 106 causes the lower and upper links 242,392 to move along the lower and upper guide rails 210,212. While the sliding door 202 is being opened, the movement of the vehicle door is subdivided into two periods. In an initial period, between the closed position and an intermediate position of the vehicle door 202, only pivoting of the control arms 270,400 is allowed by the control mechanism 234, thereby causing the door 202 to be moved laterally away from the remainder of the vehicle. Thereafter, during a second period, between the intermediate position and the open position of the door 202, the cam 332 is aligned in the housing 330. As a result, pivoting of the control arms 270,400 is no longer allowed, and the only movement that is allowed to the sliding door 202 is movement in translation with the lower and upper sliders 240,390 moving relative to the lower and upper rails 210,212. While the sliding door 202 is being closed, the cam 332 moves back into the opening 350 of the housing 330 and translation is stopped. The only movement allowed is pivoting control arms 270,400 as the cam rotates within the housing which has the effect of moving the sliding door 202 towards the remainder of the vehicle and of closing the door.

Figure 16:
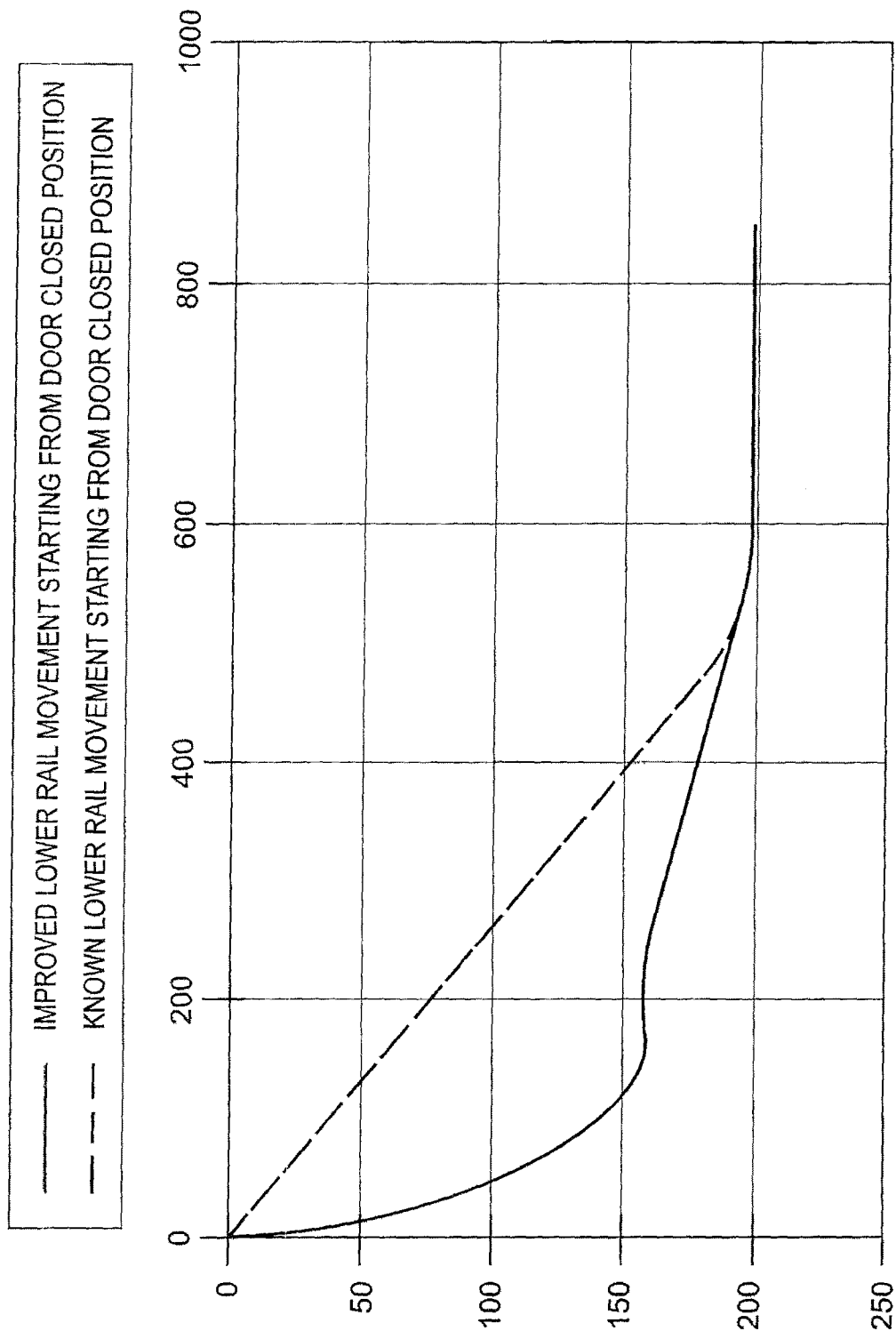
FIG. 16 graphically illustrates kinematic movement of the known lower sliding assembly and the exemplary lower sliding assembly.

The sliding door mechanism 200 uses the double pivot link on the bottom and top rails 210,212 for guiding the sliding door from the closed position to the open position. The lower and upper rails 210,212 are simplified to minimize structural intrusion, resulting in a closed section for the body structure 206. Each rail 210,212 is provided along the vehicle body 206 and has a contour mirroring an outer contour of the vehicle body such that no portion of the rail intrudes into the vehicle body. The contours of the lower and upper rails 210,212 create an improved kinematic movement path of the door as compared to the known sliding door mechanism 100 (see FIG. 16). The sliding door mechanism 200 yields a stable door movement condition that maintains all door opening and clearance requirements. The pivot is provided on each end of the control arms 270,400 to obtain a small overall kinematic function and a more simplified rail layout. With the lower and upper sliding assemblies 230,232, the new kinematic path uses a rail design that does not intrude into the surrounding body structure 206.

With reference now to FIGS. 17-20, a sliding door mechanism 500 for a vehicle V according to another exemplary embodiment of the present disclosure is depicted. Similar to sliding door mechanism 200, the sliding door mechanism 500 is associated with the middle link 106 (FIG. 5), which can be operatively connected to the drive mechanism (not shown) for opening and closing the vehicle door 202 in a front-to-rear direction of the vehicle side body structure 206. The vehicle door 202 can also be actuated manually through pulling on the door handle to open or close the door. The sliding door mechanism 500 is arranged to move or displace the vehicle door 202 from a closed position where the door generally lies in a first plane of the door opening 204 (FIG. 4) provided in the vehicle side body structure 206 into a second plane arranged laterally from and approximately parallel to the door plane and to slide the door in the second plane to an open position.

Figure 17:
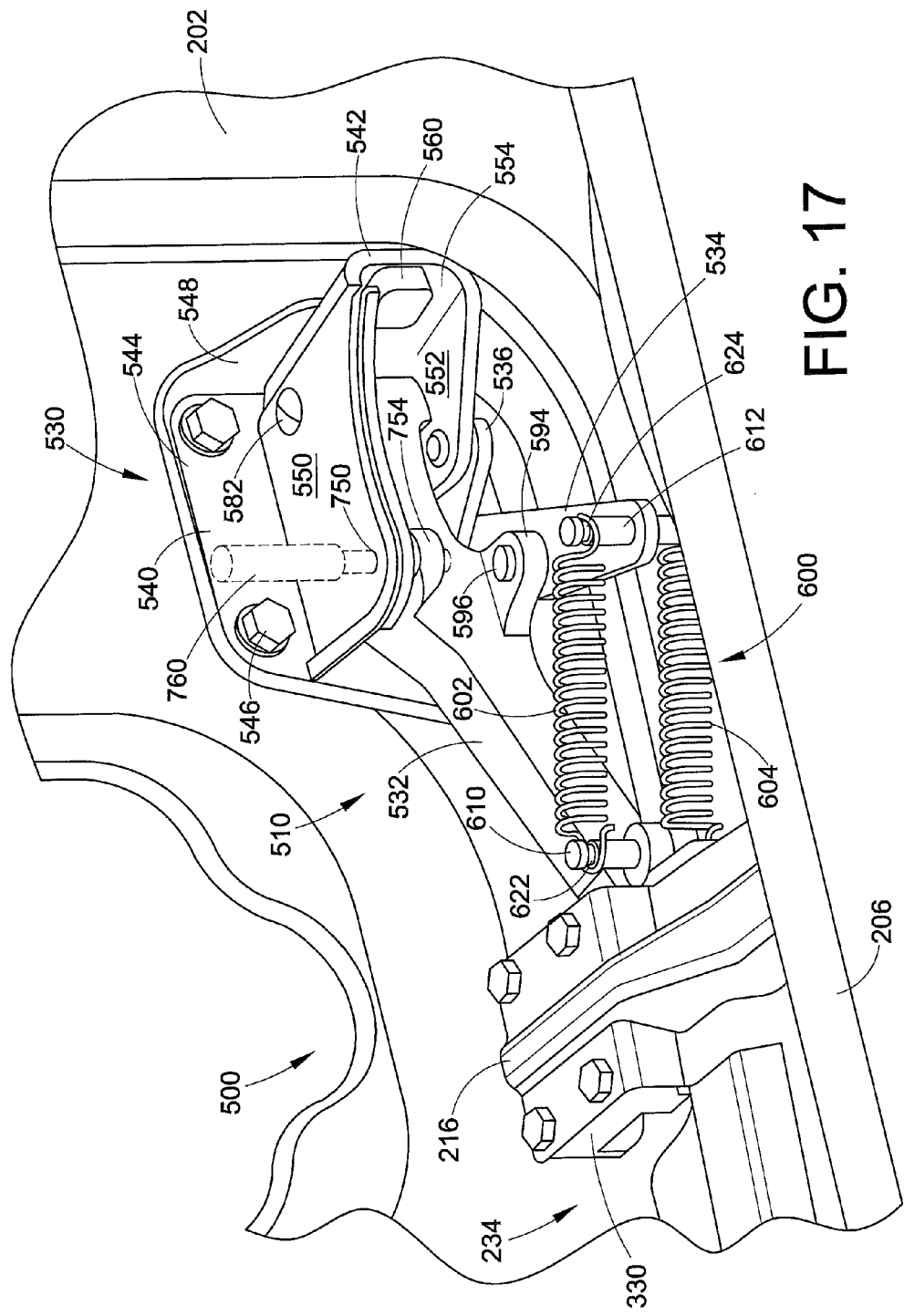
FIG. 17 is a perspective view of a lower link assembly in a closed position for a sliding door mechanism for moving the vehicle door of FIG. 4 between a closed position and an open position according to another aspect of the present disclosure.
Figure 18:
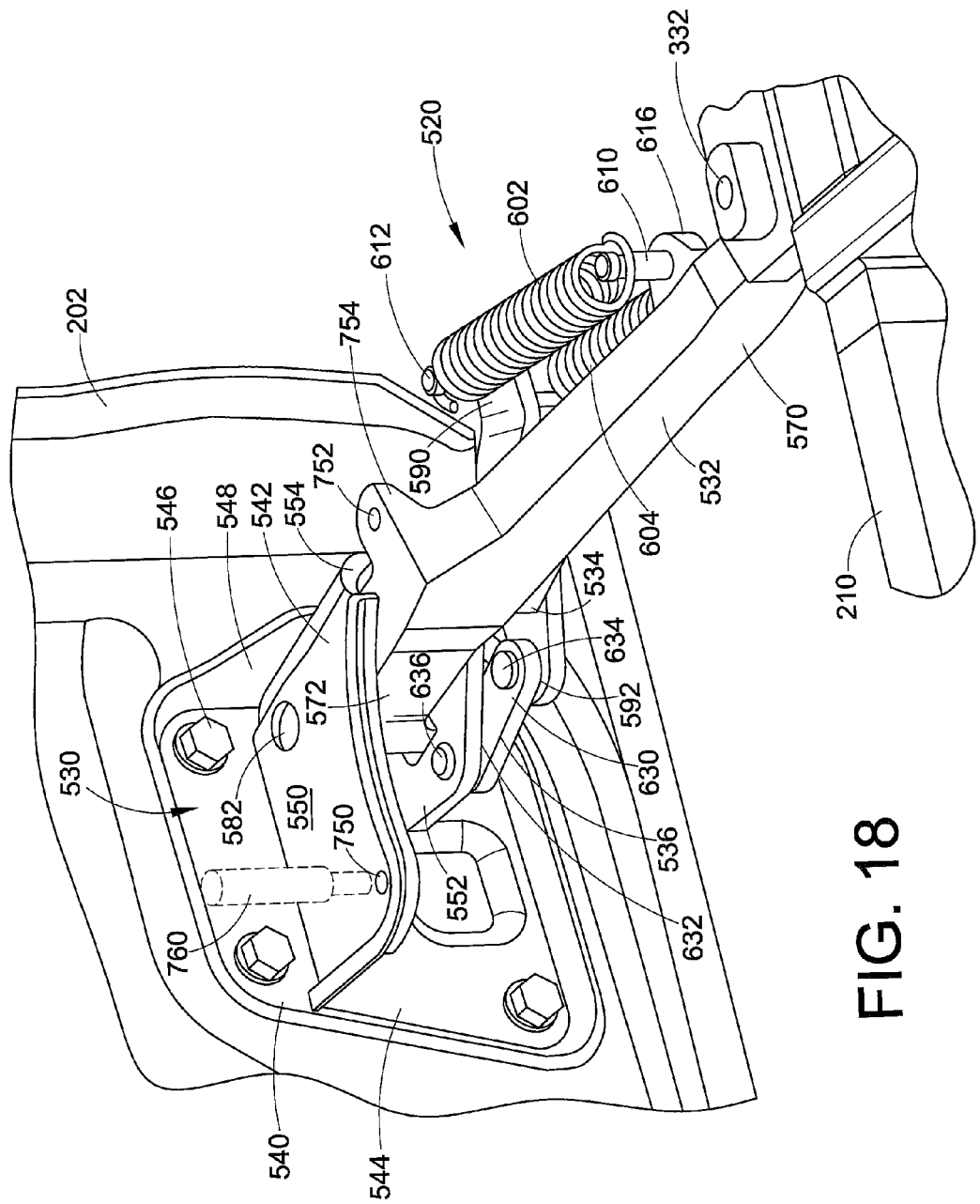
FIG. 18 is a perspective view of the lower link assembly of FIG. 17 in an open position.

The sliding door mechanism 500 generally comprises the lower slide rail 210, the upper slide rail 212, the lower slider 240 and the upper slider 390. Each slide rail extends in a front-to-rear direction of the vehicle side body structure 206 and is fixed to the side body structure. For example, the lower slide rail 210 is fixed to the lower side sill member 214 via support brackets 216,218,220 and the upper slide rail is fixed to the upper side sill member 222 (FIG. 6). As indicated previously, each of the lower and upper slide rails are appropriately shaped such that each slide rail generally conforms to the vehicle side body structure 206 so that no portion of each slide rail intrudes into the vehicle side body structure. As shown in FIG. 5, the lower slider 240 is associated with the lower rail 210 and movable along the lower rail, and the upper slider 390 is associated with the lower rail 210 and movable along the lower rail A lower sliding assembly 510 is operatively associated with the lower rail 210 and is movable along the lower rail. An upper sliding assembly 512 is operatively associated with the upper rail 212 and is movable along the upper rail. The lower and upper sliding assemblies 510,512 guide the vehicle door 202 in the front-to-rear direction. As depicted in FIGS. 17 and 18, and similar to sliding door mechanism 200, the control mechanism 234 is operatively associated with the lower sliding assembly 510. The control mechanism 234 includes the housing 330 fixedly connected to the lower rail 210 via the support bracket 216 and the cam 332. The control mechanism 234 controls rotation of the lower and upper sliding assemblies 510,512 to laterally displace the vehicle door 202 from the vehicle side body structure 206 and translation of the lower and upper sliding assemblies to slide the vehicle door along the vehicle side body structure.

With reference to FIGS. 17-20, the lower sliding assembly 510 includes a lower link assembly 520 operatively connected to the vehicle door 202 and the lower slider 240. The upper sliding assembly 512 includes an upper link assembly 522 operatively connected to the vehicle door 202 and the upper slider 390. As will be described in greater detail below, at least one link assembly of the lower link assembly 520 and upper link assembly 522 is configured to control a moment of force associated with the movement of the vehicle door 202 between the closed position and the open position. This moment of force is one of an opening moment and a closing moment and is dependent on a position of the vehicle door 202 relative to the vehicle side body structure 206. The at least one link assembly also provides for a zero moment position as the moment of force changes from one of closing and opening moment to the other of the closing and opening moment.

Each of the lower and upper link assemblies 520,522 is a four-bar linkage configured to modulate the closing moment of force and the opening moment of force throughout initial displacement of the vehicle door 202 from the vehicle body structure 202, and configured to provide the zero moment position as the moment of force changes. The exemplary lower link assembly 520 includes a bracket 530 fixed to the vehicle door 202 and defining a ground or fixed link, an input link 532, a coupler link 534 and an output or follower link 536. The input link 532 is a generally straight link and has a length greater than a length of the coupler link 534 and the output link 536. The coupler link 534 connects the input link to the output link. The output link is also a generally straight link and has the shortest length.

The bracket 530 includes a first bracket member 540 and a second bracket member 542, which is secured to the first bracket member 540. The first bracket member 540 includes a base wall 544 that is fixed to the vehicle door 202 via fasteners, such as the illustrated bolts 546, and a side wall 548. The second bracket member 542 is generally U-shaped and includes first and second walls 550 and 552 and a side wall 554. The first and second walls 550,552 extend outwardly from the base wall 544 of the first bracket member 540 and the side wall 554 interconnects the first and second walls. In the depicted embodiment, a stopper 560 is provided on the second bracket member 542 to positively control the final rotational orientation or open angle of the input link 532 (i.e., the position of the input link 532 during translational movement of the vehicle door 202 along the vehicle body 206 particularly when the door is at the rear most position).

Figure 24:
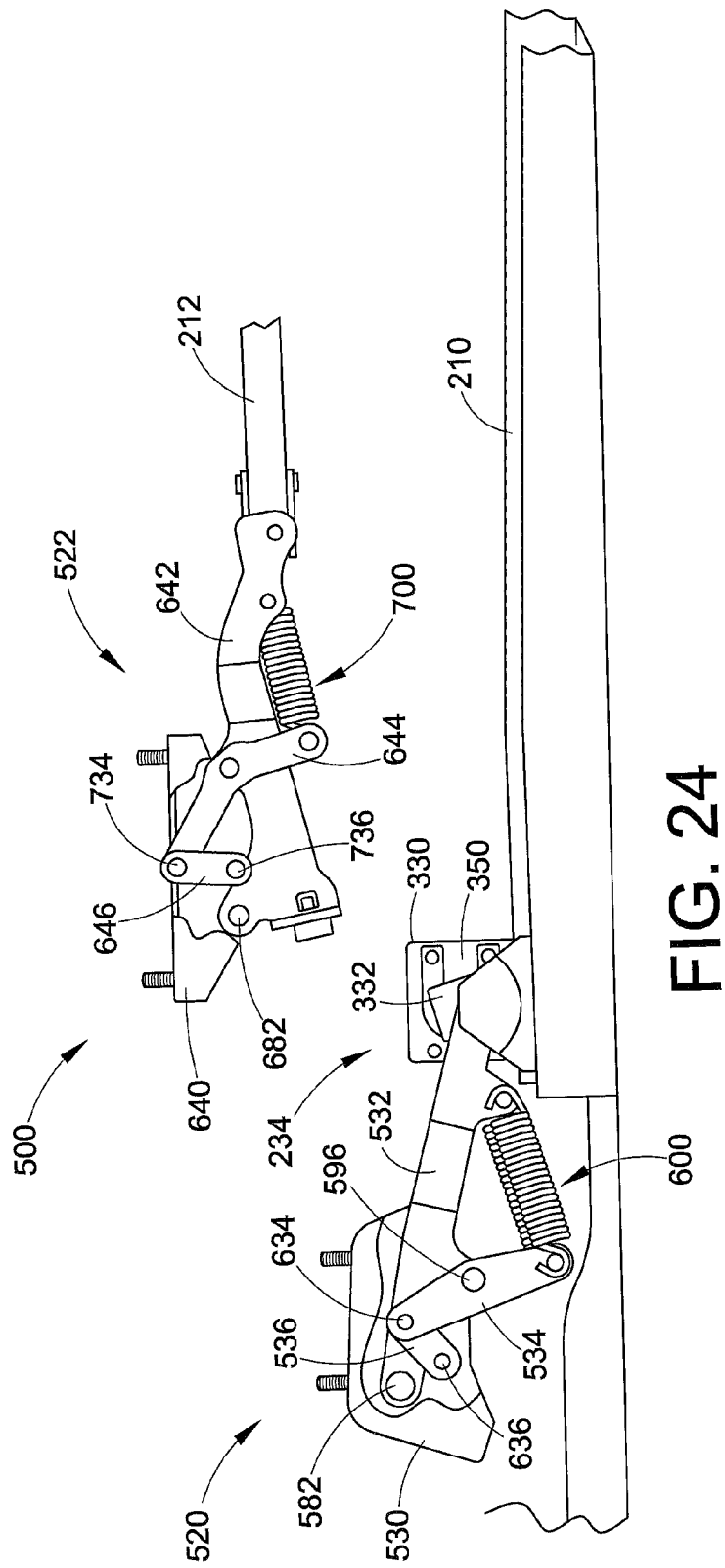
FIGS. 24-26 are bottom views illustrating the lower link assembly of FIGS. 17 and 18 and the upper link assembly of FIGS. 19 and 20 of the exemplary sliding door mechanism in various positions including the closed position, the open position and an intermediate position therebetween.
Figure 25:
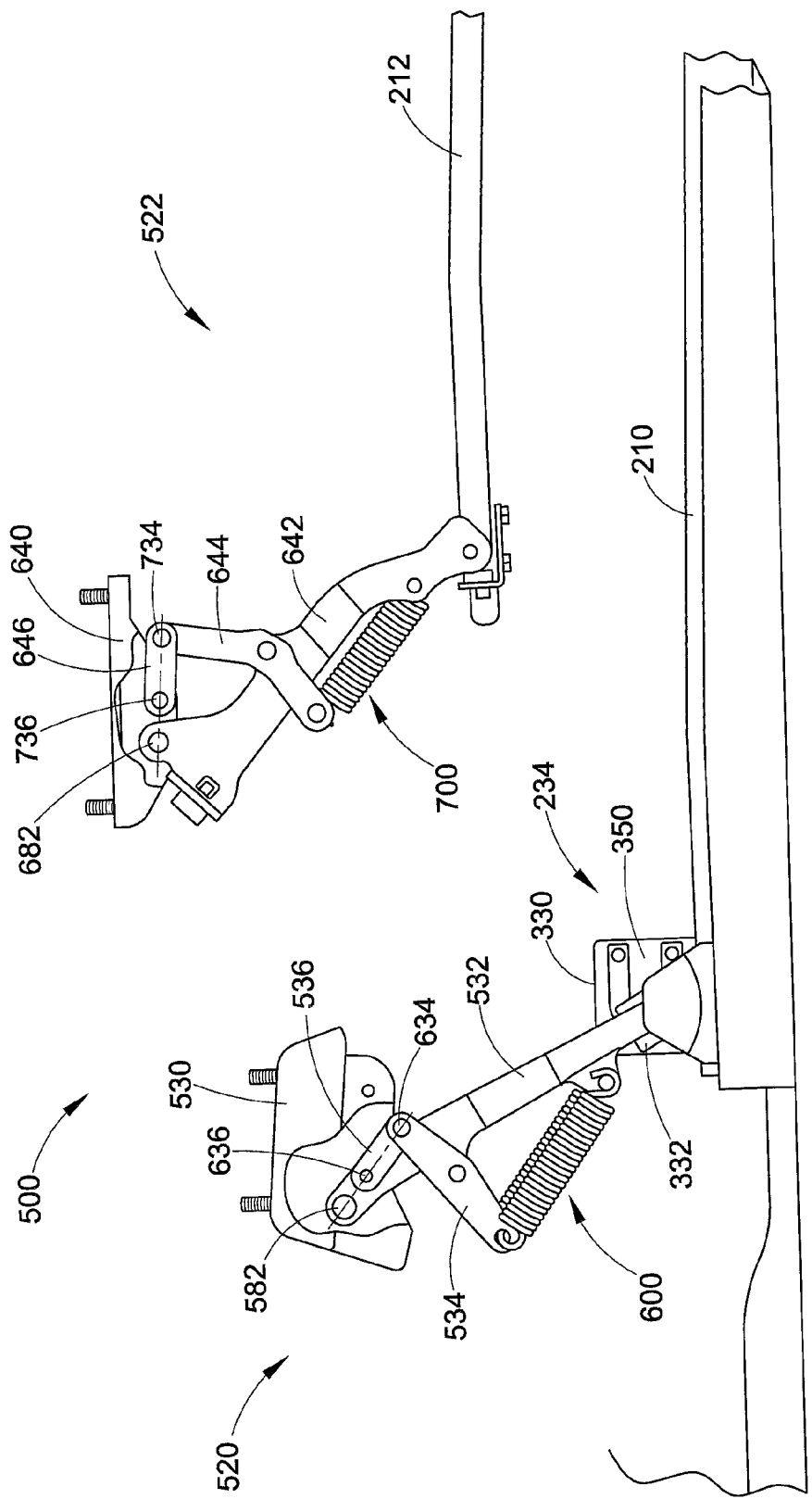
Figure 26:
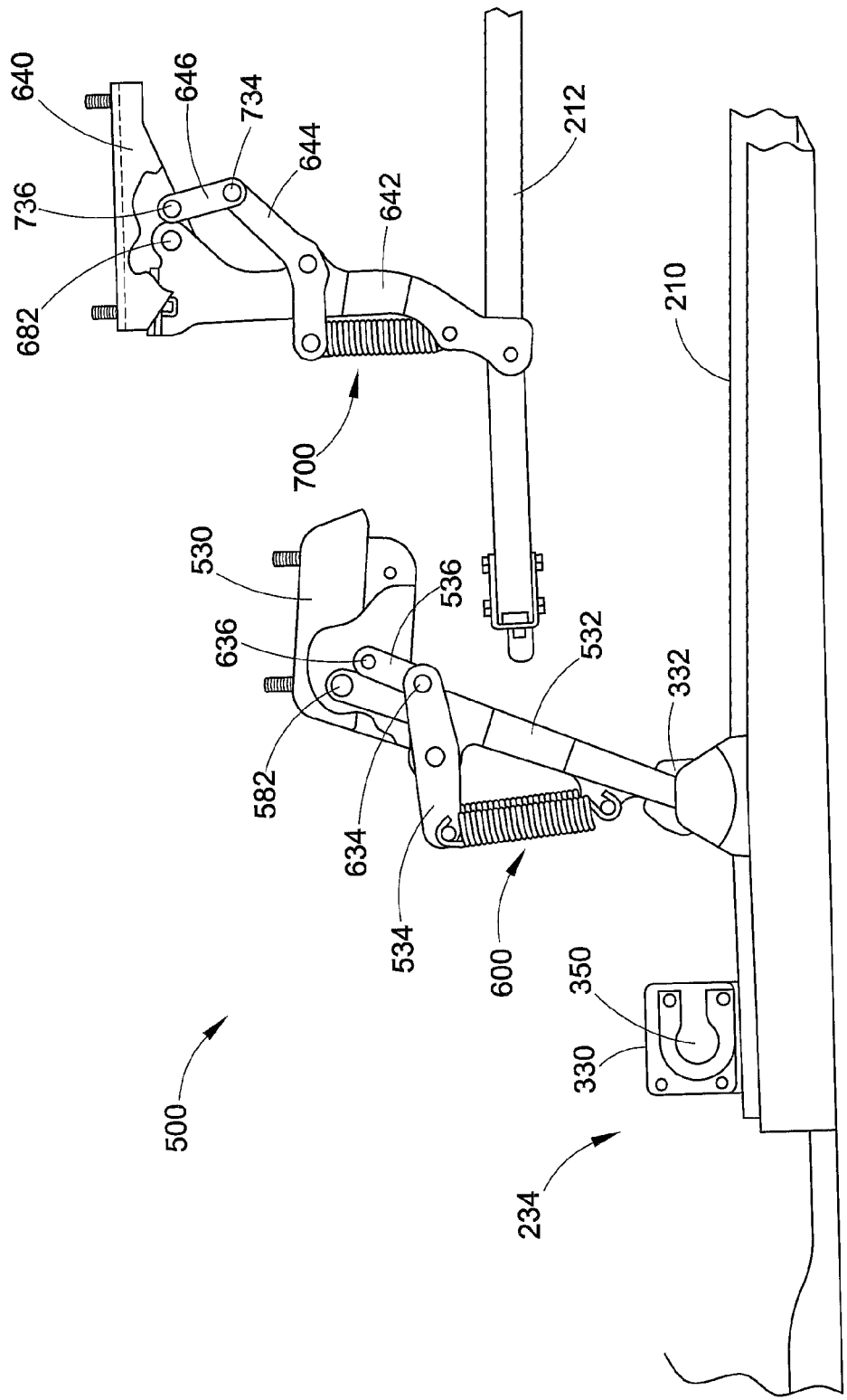

The input link 532 of the lower link assembly 520 has a proximal portion 570 pivotally connected to the lower slider 240 and a distal portion 572 pivotally connected to the bracket 530. Particularly, in the depicted exemplary embodiment, the proximal portion 570 is connected to the lower slider 240 via a first pivot pin (not shown, similar to first pivot pin 280 depicted in FIG. 8) and the distal portion 572 is connected to the second bracket member 542 via a second pivot pin 582. The first pivot pin defines an inside pivot of the input link 532 and the second pivot pin 582 defines an outside pivot of the input link 532. The cam 332 is provided at the inside pivot of the input link 532. Similar to the previous exemplary embodiment of the sliding door mechanism 200, the housing 330 is configured to rotatably and slidably receive the proximal portion 570 of the input link 532. As shown in FIGS. 24-26, the housing 330 includes the opening 350 shaped to allow for both rotation and translation of the cam 332. The cam 332 controls the rotation and translation of the input link 532 based on the constraints within the housing 330.

With continued reference to FIGS. 17 and 18, the coupler link 534 of the lower link assembly 520 has a proximal portion 590 and a distal portion 592. A central portion of the coupler link is directly pivotally connected to the input link 532 at a location between the proximal portion 570 and the distal portion 572 of the input link 532. In the depicted exemplary embodiment, a tab 594 extends outwardly from the input link 532 toward the vehicle body structure 206 when the door 202 is in the closed position. A pivot pin 596 pivotally connects the coupler link 534 to the tab 594. With this connection, the coupler link intersects the input link 532 with the proximal portion 590 extending away from the input link 532. As shown, the proximal portion 590 of the coupler link 534 is also connected to the input link 532 via a biasing member 600, which drives the coupler link 534 as the vehicle door 202 is moved between the closed position and the open position and maintains proper orientation of the lower link assembly 520 during overall kinematic movement of the lower link assembly.

According to one exemplary aspect, the biasing member 600 is at least one spring having one end connected to the input link 532 adjacent the proximal portion 570 and the other end connected to the proximal portion 590 of the coupler link 534. In the depicted embodiment, a pair of springs 602, 604 are provided for the biasing member 600; although, it should be appreciated that a single spring can be used to drive the coupler link 536. With reference back to the depicted embodiment, to connect the springs 602,604 to the lower link assembly 520, a pair of posts 610,612 is provided. Post 610 extends through an opening provided on a tab 616 extending outwardly from the input link 532 near the proximal portion 570. Post 612 extends through an opening provided on an end of the proximal portion 590 of the coupler link 534. To mount the springs 602,604, opposed ends of each post 610,612 can be provided with grooves 622,624 which extend at least partially around an outer surface of the post. One end of spring 602, for example, can be received in groove 622 and the other end of spring 602 can be received in groove 624. Although, it should be appreciated that alternative manners for connecting the springs 602,604 to the lower link assembly 520 are contemplated. It is also contemplated that the biasing member 600 can be a gas damper and the like to generate force as well as manage rate of movement (i.e., damping affect).

The output link 536 of the lower link assembly 520 has a proximal portion 630 pivotally connected to the distal portion 592 of the coupler link 534 and a distal portion 632 pivotally connected to the bracket 530. In the illustrated exemplary embodiment, the proximal portion 630 is connected to the coupler link 534 via a first pivot pin 634 and the distal portion 632 is connected to the second wall 552 of the second bracket member 542 via a second pivot pin 636. The first pivot pin 634 defines an inside pivot of the output link 536 and the second pivot pin 636 defines an outside pivot of the output link 536. As show in FIG. 17, the outside pivot 636 is spaced inwardly (i.e., toward the vehicle body structure 206) from the outside pivot 582 defined by the input link 532.

Figure 19:
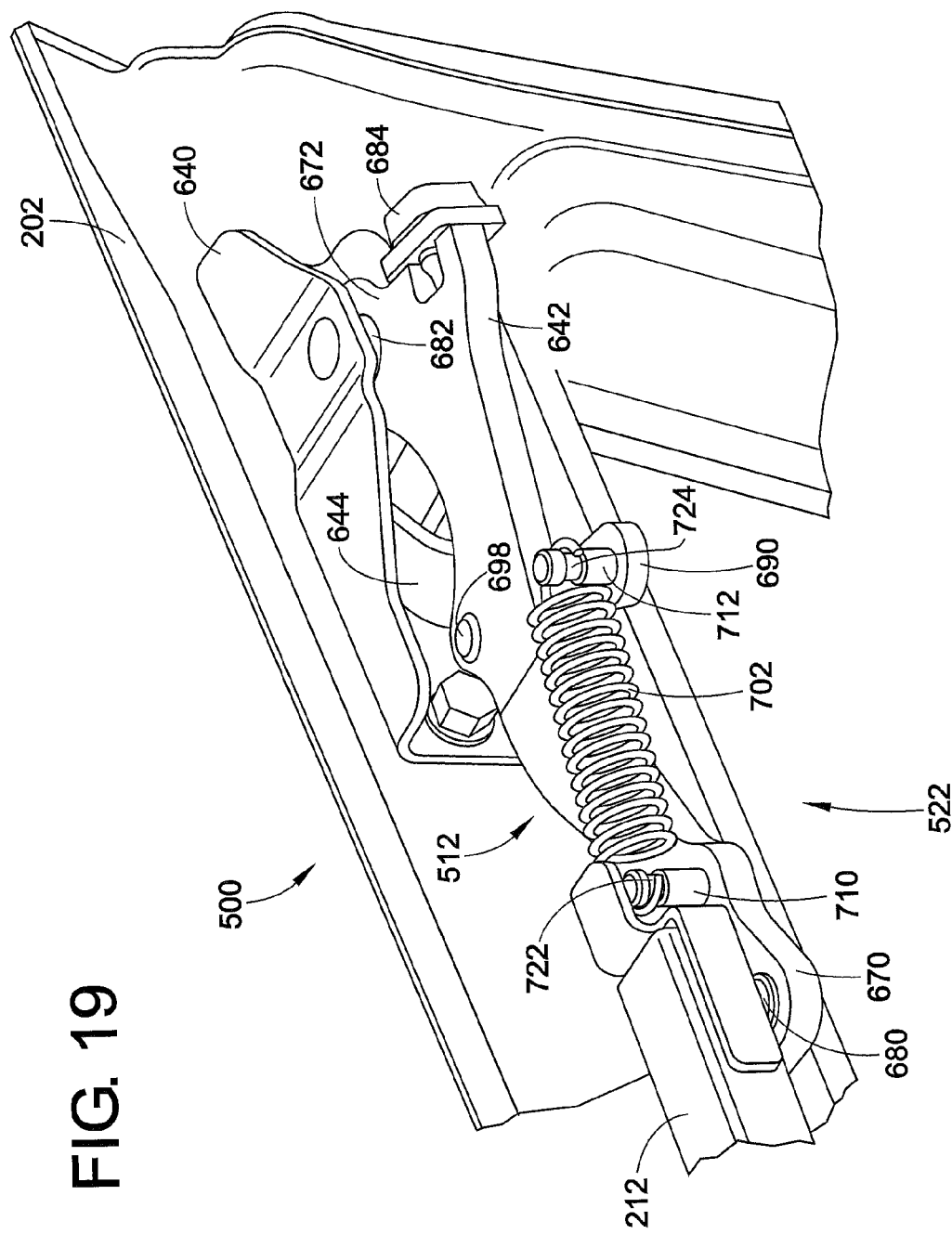
FIG. 19 is a perspective view of an upper link assembly in a closed position for the sliding door mechanism of FIG. 17.
Figure 20:
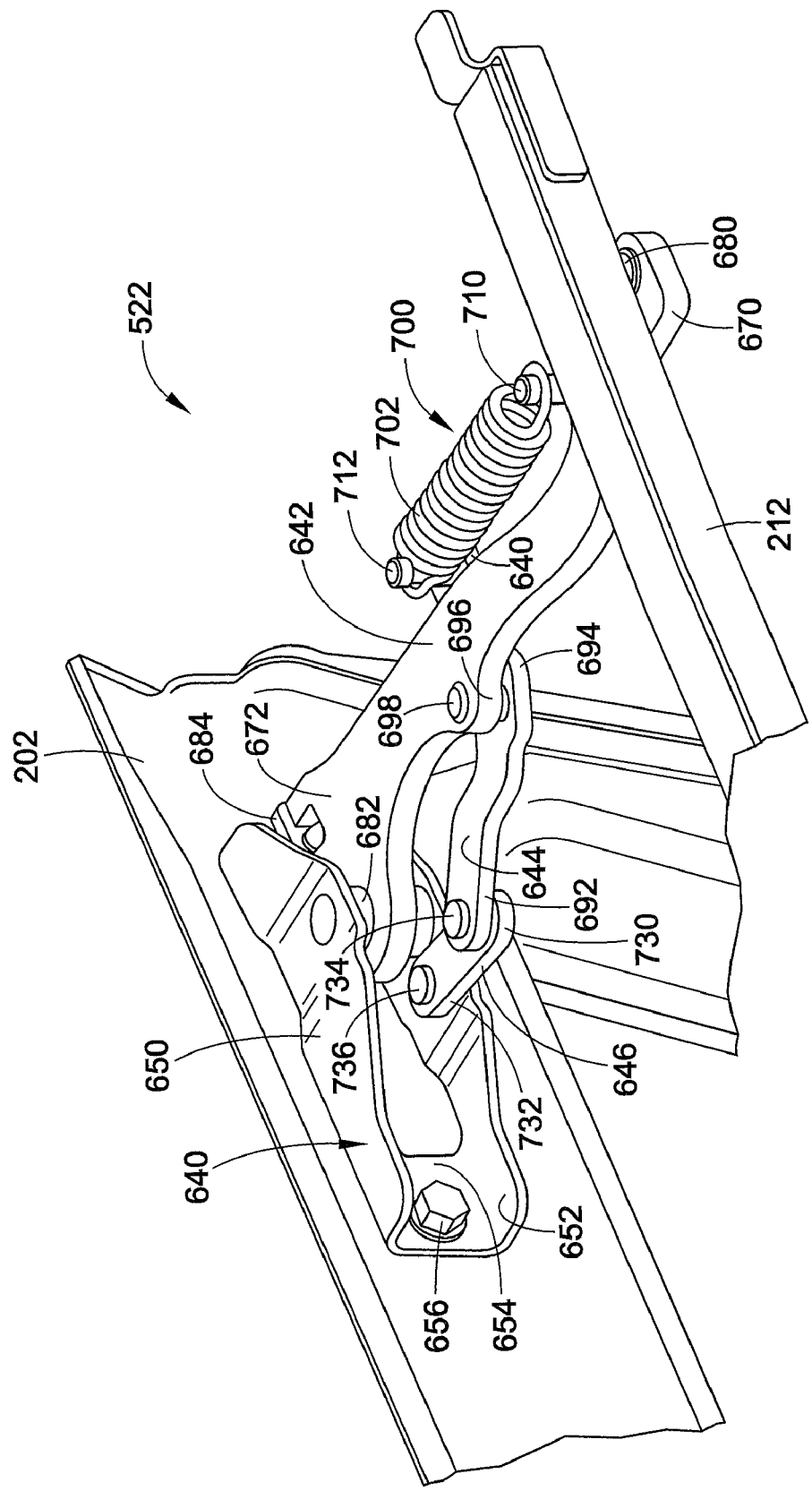
FIG. 20 is a perspective view of the upper link assembly of FIG. 18 in an open position.
Figure 21:
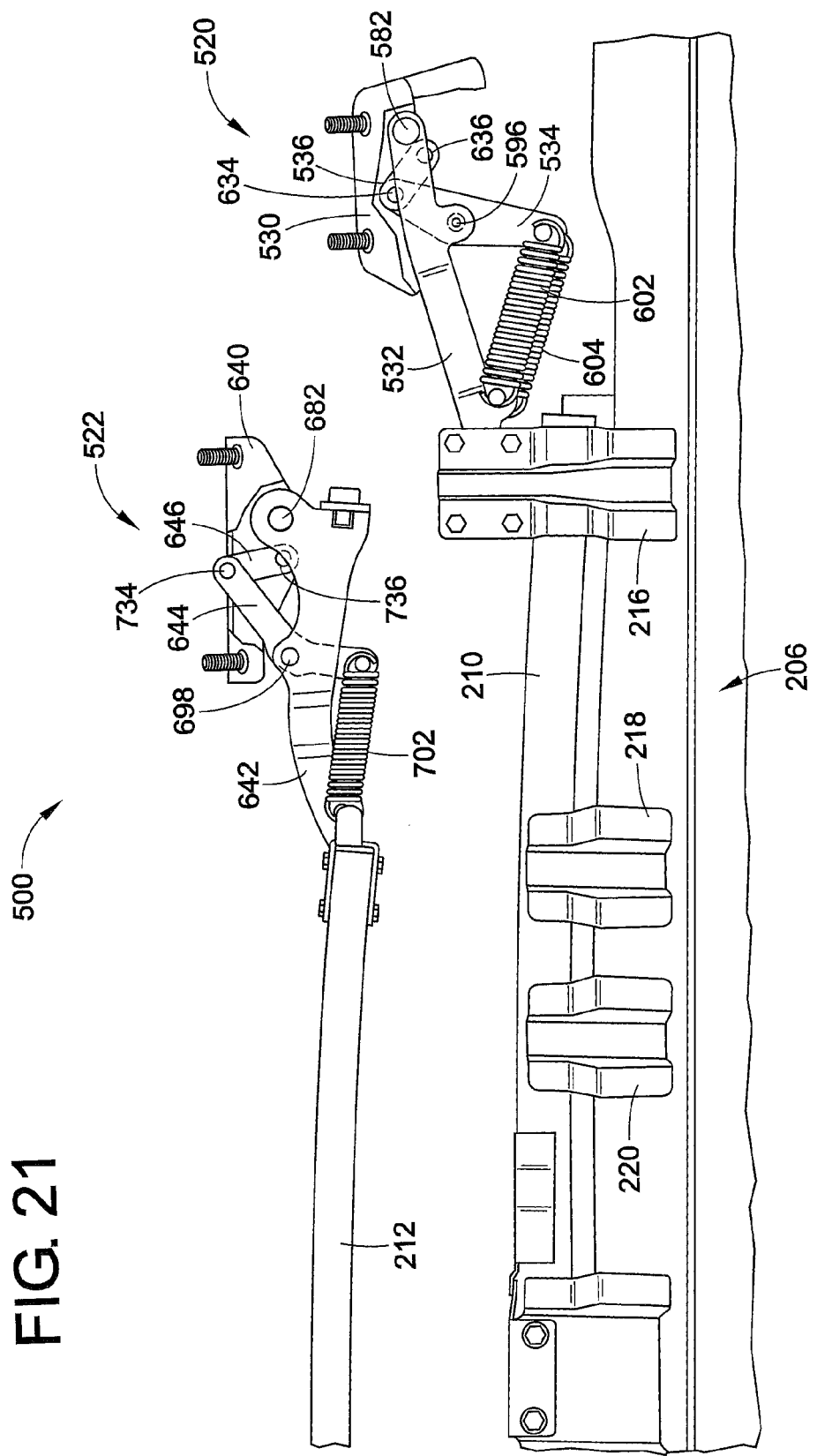
FIGS. 21-23 are top views illustrating the lower link assembly of FIGS. 17 and 18 and the upper link assembly of FIGS. 19 and 20 of the exemplary sliding door mechanism in various positions including the closed position, the open position and an intermediate position therebetween.
Figure 22:
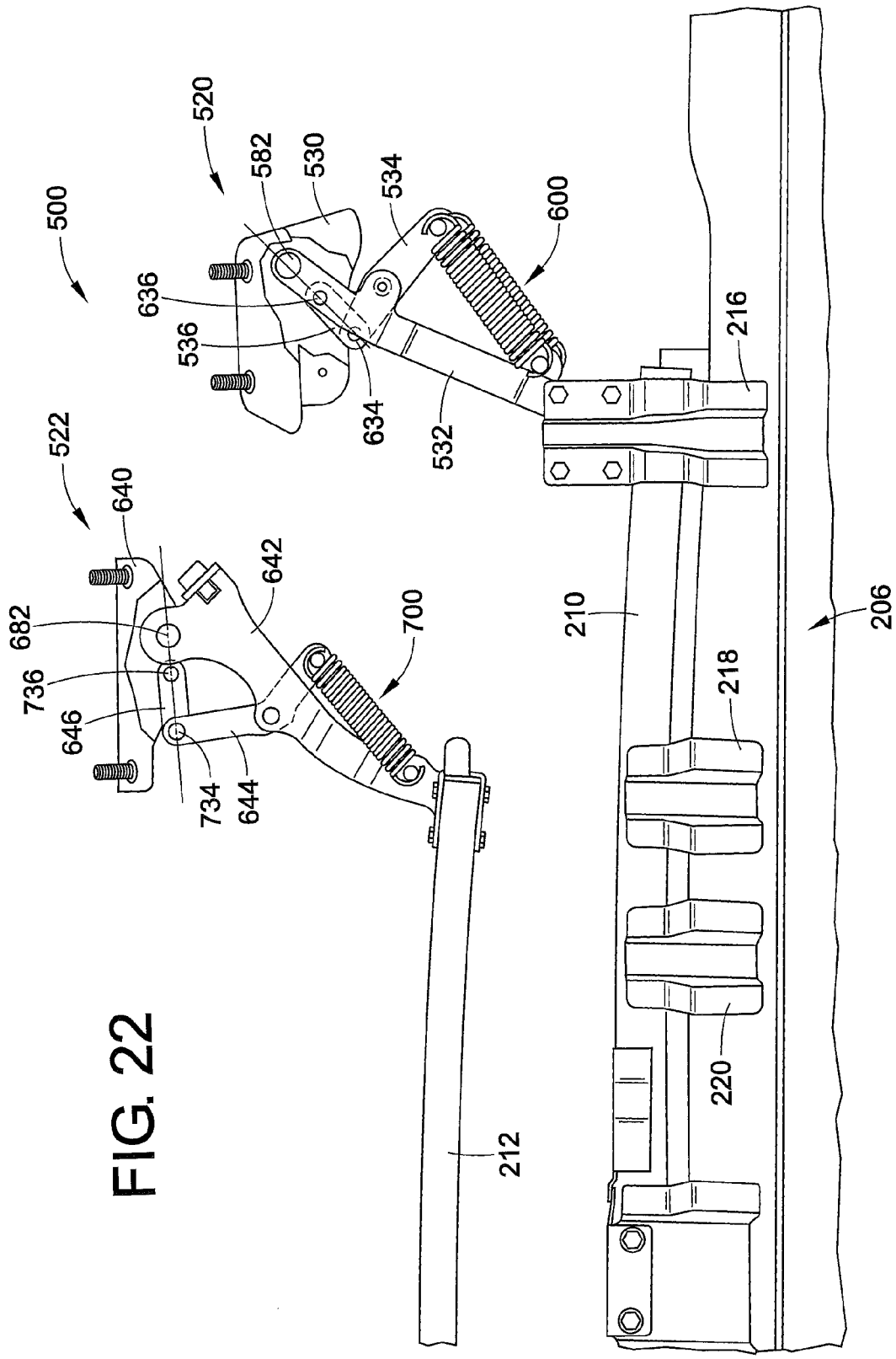

With reference now to FIGS. 19 and 20, the exemplary upper link assembly 522 includes a bracket 640 fixed to the vehicle door 202 and defining a ground or fixed link, an input link 642, a coupler link 644 and an output or follower link 646. The upper link assembly 522 is generally controlled by the control mechanism 234 operatively associated with the lower link assembly 520. The input link 642 is a generally straight link and has a length greater than a length of the coupler link 644 and the output link 646. The coupler link 644 is generally L-shaped and connects the input link 642 to the output link 646. The output link 646 is also a generally straight link and has the shortest length. The bracket 640 is generally U-shaped and includes first and second walls 650 and 652 and a base wall 654 that interconnects the first and second walls. The base wall 654 is fixed to the vehicle door 202 via fasteners, such as the illustrated bolts 656. The first and second walls 650,652 extend outwardly from the base wall 654 and generally perpendicular to the vehicle door 202.

The input link 642 of the upper link assembly 522 has a proximal portion 670 pivotally connected to the upper slider 390 (FIG. 5) and a distal portion 672 pivotally connected to the bracket 640. Particularly, in the depicted exemplary embodiment, the proximal portion 670 is connected to the upper slider 390 via a first pivot pin 680 and the distal portion 672 is connected to the bracket 640 via a second pivot pin 682. The first pivot pin 680 defines an inside pivot of the input link 642 and the second pivot pin 682 defines an outside pivot of the input link. A stopper 684 can be provided on the distal portion 672 and is spaced from the second pivot pin 682. Similar to stopper 560, stopper 684 positively controls the final rotational orientation or open angle of the input link 642.

The coupler link 644 of the upper link assembly 522 is generally L-shaped and has a proximal portion 690 and a distal portion 692. A central portion 694 of the coupler link is directly pivotally connected to the input link 642 at a location between the proximal portion 670 and the distal portion 672 of the input link 642. Thus, the coupler link 644 generally intersects the input link 642. To provide for the pivotal connection, the input link 642 includes a tab 696 which extends outwardly from a central portion of the input link 642 toward the vehicle door 202 when the door is in the closed position. A pivot pin 698 pivotally connects the coupler link 644 to the tab 696. As shown, the proximal portion 690 of the coupler link 644 is also connected to the input link 642 via a biasing member 700, which drives the coupler link 644 as the vehicle door 202 is moved between the closed position and the open position. Similar to the lower link assembly 520, the biasing member 700 is a spring 702 having one end connected to the input link 532 adjacent the proximal portion 670 and the other end connected to the proximal portion 690 of the coupler link 644. The spring 702 is connected to the upper link assembly 522 in a manner similar to the connection of the springs 602,604 to the lower link assembly 520. As depicted, a post 710 extends through an opening located near the proximal portion 670 on the input link 642. Another post 712 extends through an opening provided on an end of the proximal portion 690 of the coupler link 644. An end of each post 710,712 can be provided with grooves 722,724 dimensioned to receive one end of the spring 702. Again, alternative manners for connecting the spring 702 to the upper link assembly 522 are contemplated. It is also contemplated that the biasing member 700 can be a gas damper to generate force as well as manage rate of movement (i.e., damping affect).

With continued reference to FIGS. 19 and 20, the output link 646 of the upper link assembly 522 has a proximal portion 730 pivotally connected to the distal portion 692 of the coupler link 644 and a distal portion 732 pivotally connected to the bracket 640. In the depicted exemplary embodiment, the proximal portion 730 is connected to the coupler link 644 via a first pivot pin 734 and the distal portion 732 is connected to the second wall 652 of the bracket 640 via a second pivot pin 736. The first pivot pin 734 defines an inside pivot of the output link 646 and the second pivot pin 736 defines an outside pivot of the output link. The outside pivot 736 is spaced inwardly (i.e., toward the vehicle body structure 206) from the outside pivot 682 defined by the input link 642.

The operation of the sliding door mechanism 500 will be described with reference to FIGS. 21-26. To open the vehicle door 202, the drive mechanism (not shown) can be actuated causing the middle link 106 (FIG. 5) to translate along the vehicle side body structure 206 via the middle guide rail 114 in a front-to-rear direction. Again, in a manual mode, the vehicle door can be actuated through pulling on the door handle. Movement of the middle link 106 causes the lower and upper link assemblies 520,522 to move along the lower and upper guide rails 210,212. While the sliding door 202 is being opened, the movement of the vehicle door is subdivided into two periods. In an initial period, between the closed position (FIGS. 21 and 24) and an intermediate position of the vehicle door 202, only pivoting of the lower and upper link assemblies 520,522 is allowed by the control mechanism 234, thereby causing the door 202 to be moved laterally away from the remainder of the vehicle. Thereafter, during a second period, between the intermediate position and the open position (FIGS. 23 and 26) of the door 202, the cam 332 is aligned in the housing 330. As a result, pivoting is no longer allowed, and the only movement that is allowed to the sliding door 202 is movement in translation with the lower and upper sliders 240,390 moving relative to the lower and upper rails 210,212. While the sliding door 202 is being closed, the cam 332 moves back into the opening 350 of the housing 330 and translation is stopped. The only movement allowed is pivoting of the lower and upper link assemblies 520,522 as the cam 332 rotates within the housing 350 which has the effect of moving the sliding door 202 towards the remainder of the vehicle and of closing the door. The transition between one of the closing and opening moments to the other of the closing and opening moments occurs as the cam 332 rotates within the fixed housing 350.

Figure 27:
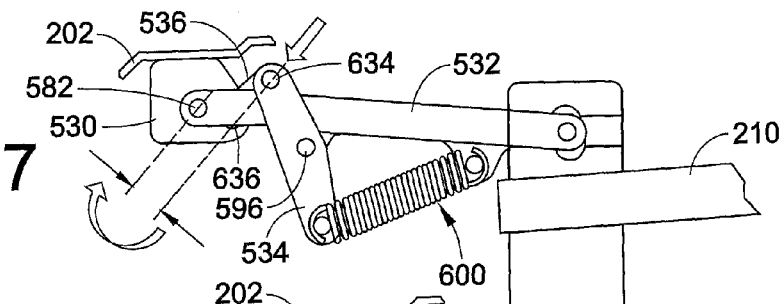
FIGS. 27-29 schematically illustrate a closing moment, an opening moment and a zero moment associated with the lower link assembly of FIGS. 17 and 18 and the movement of the vehicle door between the closed position and the open position.
Figure 30:
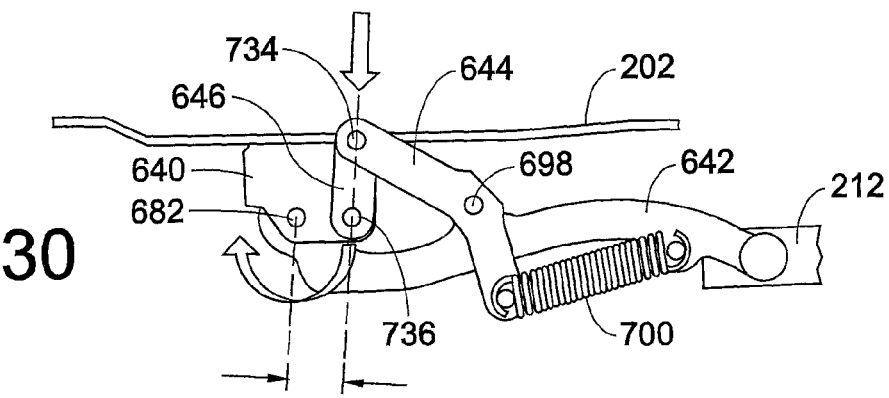
FIGS. 30-32 schematically illustrate a closing moment, an opening moment and a zero moment associated with the upper link assembly of FIGS. 19 and 20 and the movement of the vehicle door between the closed position and the open position.

In the closed position of the vehicle door 202 (FIGS. 21 and 24), the input links 532,642 extend generally parallel to the guide rails 210,212. The force of each biasing member 600, 700 pulls the proximal portion 590,690 of each coupler link 534,644 toward the proximal portion 570,670 of each input link 532,642. The inside pivot 634,734 of each output link 536,646 is positioned generally forward of the outside pivot 636,736 of each output link 536,646 toward the vehicle door 202. As schematically illustrated in FIG. 27, a plane intersecting the inside and outside pivots 634,636 of output link 536 is spaced from the outside pivot 582 of input link 532. Similarly, as shown in FIG. 30, a plane intersecting the inside and outside pivots 734,736 of output link 646 is spaced from the outside pivot 682 of input link 642. This distance between the plane and the outside pivot 582,682 of each input link defines a moment arm of the closing moment about the outside pivot 582,682 of each input link 532,642. This closing moment maintains the vehicle door 202 in the closed position.

Figure 28:
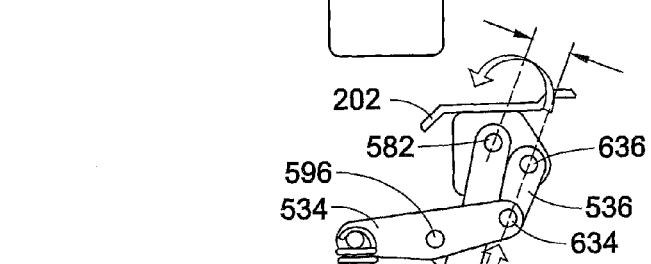
Figure 31:
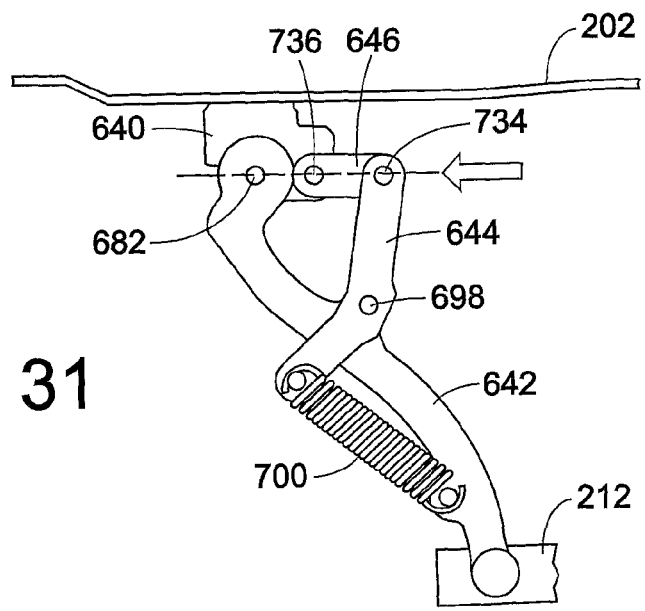

As the door 202 is being moved from the closed position to the intermediate position, the input links 532,642 rotate about their respective inside pivots. This causes the proximal portion 630,730 of each output link 536,646 to pivot about their respective outside pivot 636,736 toward the vehicle body structure 206 away from the vehicle door 202. The coupler links 534,644, in turn, are rotated about their respective pivots 596,698 causing stretching of the biasing members 600,700. As graphically illustrated in FIG. 33, the closing moment associated with each of the lower and upper link assemblies 510,512 decreases as the vehicle door 202 is moved toward the intermediate position. As schematically illustrated in FIGS. 28 and 31, prior to the door 202 being in the intermediate position, a plane intersecting the inside pivots 634,734 and outside pivots 636,736 of each output link 536,646 is in substantial alignment with the outside pivot 582,682 of each input link 532,642. This provides for the zero moment about each outside pivot 582,682 of the input link 532,642 whereby the vehicle door 202 is neither urged in the closed position nor the open position (see FIGS. 22 and 25).

Figure 23:
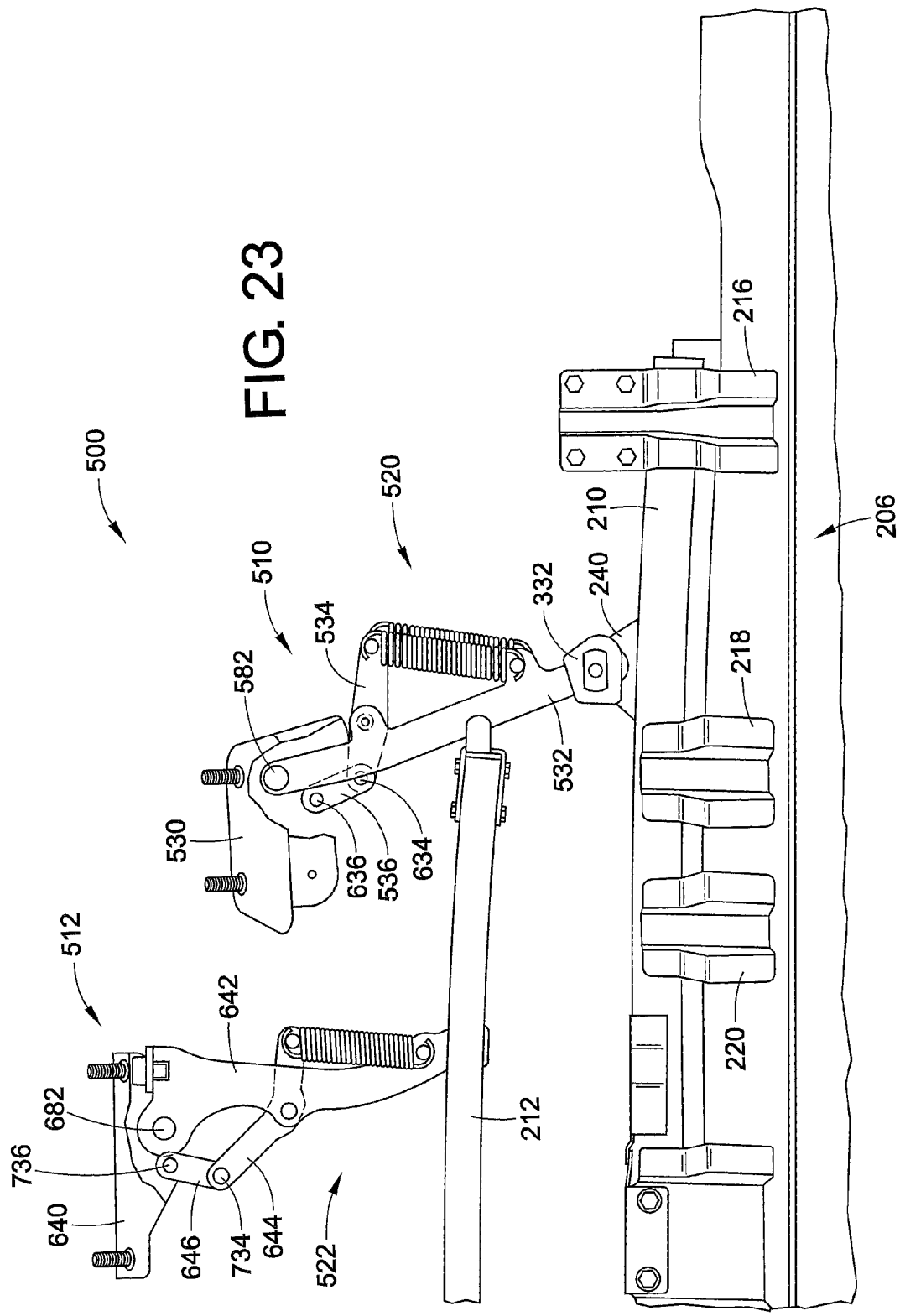
Figure 29:
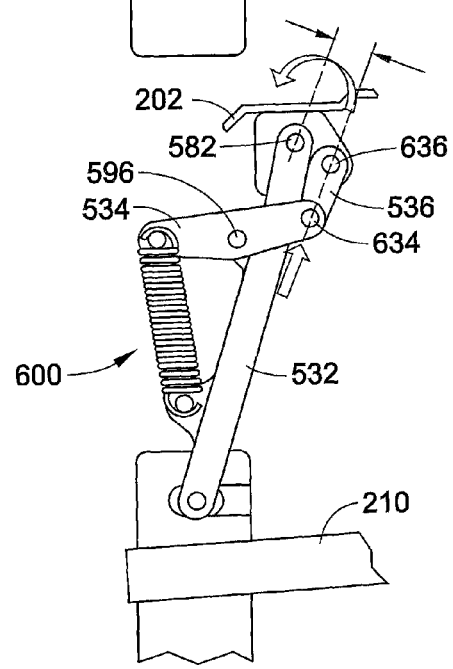
Figure 32:
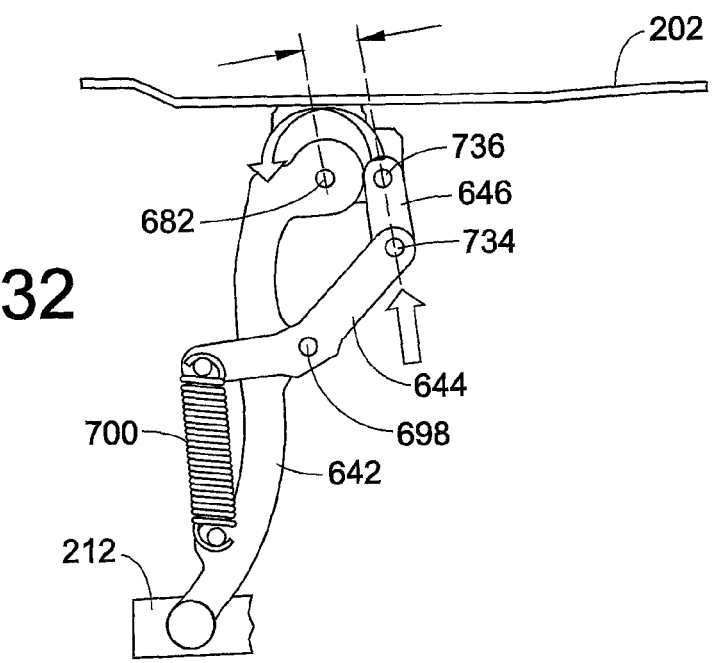

As shown in FIGS. 23 and 26, the input links 532,642 continue to rotate about their respective inside pivots as the vehicle door 202 moves toward the intermediate position, which then allows the door to translate to the open position. As the lower and upper link assemblies 520,522 move past their respective zero moments, the biasing members 600,700 pull on the proximal portions 590,690 of the coupler links 534,644. The proximal portion 630,730 of each output link 536,646 continues to pivot about their respective outside pivots 636,736 toward the vehicle body structure 206. In the vehicle door open position, the inside pivot 634,734 of each output link is positioned generally rearward of the outside pivot 636,736 away from the vehicle door 202. As schematically illustrated in FIG. 29, a plane intersecting the inside and outside pivots 634,636 of output link 536 is again spaced from the outside pivot 582 of input link 532. Similarly, as shown in FIG. 32, a plane intersecting the inside and outside pivots 734,736 of output link 646 is spaced from the outside pivot 682 of input link 642. This distance between the plane and the outside pivot 582,682 of each input link defines a moment arm of the opening moment about the outside pivot 582,682 of each input link 532,642. This opening moment maintains the vehicle door 202 in the open position.

Thus, in the vehicle door closed position, the inside pivot 634,734 of each output link 536,646 is positioned generally forward of the outside pivot 636,736 toward the vehicle door 202. As the vehicle door is displaced from the vehicle body structure 206, the input link 532,642 rotates in a first direction causing the coupler link 534,644 and output link 536,646 to rotate in a second direction. In the vehicle door open position, the inside pivot 634,734 of each output link 536,646 is positioned generally rearward of the outside pivot 636,736 away from the vehicle door 202. In both the door closed position and door open position, a plane intersecting the inside pivot 634,734 and outside pivot 636,736 of each output link 536, 646 is spaced from the outside pivot 582,682 of each input link 532,642 during both the closing movement and opening movement. The distance between the plane and outside pivot 582,682 of each input link 532,642 defines a moment arm which urges the vehicle door in one of the closed and open position. Movement of the inside pivot 634,734 and outside pivot 636,736 of each output link 536,736 in substantial alignment with the outside pivot 582,682 of each input link 532,642 provides for the zero moment whereby the vehicle door is neither urged in the closed position nor the open position.

With reference again to FIG. 33, with the above described construction of the exemplary sliding door mechanism 500, the peak closing moment of the lower link assembly 520 can be approximately equal to the peak opening moment of the lower link assembly 520. The peak closing moment of the upper link assembly 522 can be approximately equal to the peak opening moment of the upper link assembly 522. Thus, according to one exemplary aspect, the opening moment of force is the inverse of the closing moment of force thereby providing a smooth movement of the vehicle door 202 between the closed and open positions. Although, it should be appreciated that in tuning the sliding door mechanism 500, there can be variations in the overall balance of the opening and closing moments. For example, the peak opening moment can be reduced and the peak closing moment can be increased, or vice versa.

The lower link assembly 520 further includes a locking device for locking the vehicle door in the closed position. More particularly, and as depicted in FIGS. 17 and 18, the bracket 530 includes an aperture 750 and the input link 532 includes a corresponding aperture 752. The aperture 752 is provided on a tab 754 located generally above tab 594. The bracket aperture 750 is in registry with the input link aperture 752 in the vehicle door closed position. A pin 760 is sized to be selectively inserted through the apertures 750,752 for locking the four-bar linkage. The pin 760 can be a solenoid-type pin that can be selectively moved from an extended position and a retracted position depending of the position of the vehicle door 202. The pin 760 can be electrically connected to the vehicle control unit such that the pin automatically extends through the apertures 750,752 when the door 202 is in the closed position. This lock, which is supplementary to conventional door lock system, can increase the force capacity for the lower link assembly 520 for reacting loads related to door retention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A sliding door mechanism for a vehicle arranged to move a door from a door opening provided in a vehicle side body structure from a closed position to an open position, the sliding door mechanism comprising:
   an upper slide rail and a lower slide rail fixed to the vehicle side body structure;
   an upper slider associated with the upper rail and movable along the upper rail and a lower slider associated with the lower rail and movable along the lower rail;
   an upper link assembly operatively connected to the vehicle door and the upper slider; and
   a lower link assembly operatively connected to the vehicle door and the lower slider, wherein at least one link assembly of the upper link assembly and lower link assembly is configured to vary a moment of force about a pivot while moving the vehicle door between the closed position and the open position, the moment of force being one of an opening moment and a closing moment and being dependent on a position of the vehicle door relative to the vehicle side body structure, the at least one link assembly being configured such that the moment of force is substantially zero between when the vehicle door moves between the closed position and the open position.

2. The sliding door mechanism of claim 1, wherein the at least one link assembly is a four-bar linkage including:
   a bracket fixed to the vehicle door, the bracket defining a fixed link,
   an input link having a proximal portion pivotally connected to one of the sliders to define an inside pivot and a distal portion pivotally connected to the bracket to define an outside pivot,
   a coupler link having a proximal portion and a distal portion and being pivotally connected to the input link at a location between the proximal and distal portions of the coupler link, and
   an output link having a proximal portion pivotally connected to the distal portion of the coupler link to define an inside pivot and a distal portion pivotally connected to the bracket to define an outside pivot.

3. The sliding door mechanism of claim 2, further including a biasing member for driving the coupler link in an opposite rotational direction of the rotational direction of the input link as the vehicle door is moved between the closed position and the open position.

4. The sliding door mechanism of claim 3, wherein the biasing member is a spring having one end connected to the proximal portion of the input link and the other end connected to the proximal portion of the coupler link.

5. The sliding door mechanism of claim 3, wherein in the vehicle door closed position, the inside pivot of the output link is positioned generally forward of the outside pivot toward the vehicle door, a plane intersecting the inside and outside pivots of the output link being spaced from the outside pivot of the input link, wherein a distance between the plane and the outside pivot of the input link defining a moment arm of the closing moment about the outside pivot of the input link.

6. The sliding door mechanism of claim 5, wherein in the vehicle door open position, the inside pivot of the output link is positioned generally rearward of the outside pivot away from the vehicle door, the plane intersecting the inside and outside pivots of the output link being spaced from the outside pivot of the input link, wherein a distance between the plane and the outside pivot of the input link defining a moment arm of the opening moment about the outside pivot of the input link.

7. The sliding door mechanism of claim 6, wherein movement of the inside pivot and outside pivot of the output link in substantial alignment with the outside pivot of the input link provides for the zero moment about the outside pivot of the input link whereby the vehicle door is neither urged in the closed position nor the open position.

8. The sliding door mechanism of claim 2, wherein each of the upper and lower link assemblies is a four-bar linkage configured to control the closing and opening moments associated with the movement of the vehicle door between the closed position and open position.

9. The sliding door mechanism of claim 2, further including a control mechanism connected to the vehicle side body structure, the control mechanism including a fixed housing and a cam located on the proximal portion of the input link and configured to rotatably and slidably move within the fixed housing, the cam controlling rotation and translation of the input link based on predetermined constraints associated with the housing.

10. The sliding door mechanism of claim 9, wherein the transition between one of the closing and opening moments to the other of the closing and opening moments occurs as the cam rotates within the fixed housing.

11. The sliding door mechanism of claim 2, wherein the bracket includes an aperture and the input link includes a corresponding aperture, the bracket aperture being in registry with the input link aperture in the vehicle door closed position and further including a pin sized to be selectively inserted through the apertures for locking the four-bar linkage.

12. The sliding door mechanism of claim 1, wherein the peak closing moment is approximately equal to the peak opening moment thereby providing for an overall smooth movement of the vehicle door between the closed and open positions.

13. A sliding door mechanism for a vehicle arranged to laterally displace a door from a door opening provided in a vehicle side body structure and translate the door along the vehicle side body structure to an open position, the sliding door mechanism comprising:
   an upper guide rail and a lower guide rail, each of the guide rails being attached to the vehicle side body structure;
   an upper four-bar link assembly operatively connected to the upper guide rail and the vehicle sliding door; and
   a lower four-bar link assembly operatively connected to the lower guide rail and the vehicle sliding door, wherein each of the upper and lower four-bar link assemblies is configured to modulate a closing moment of force and an opening moment of force throughout initial displacement of the vehicle door from the vehicle body structure, and provides for a zero moment position as the moment of force changes from one of closing and opening moment to the other of the closing and opening moment.

14. The sliding door mechanism of claim 13, wherein the opening moment of force is the inverse of the closing moment of force thereby providing a smooth movement of the vehicle door between the closed and open positions.

15. The sliding door mechanism of claim 13, wherein each of the upper and lower four-bar link assemblies includes:
   a bracket fixed to the vehicle door, the bracket defining a fixed link,
   an input link having a proximal portion pivotally connected to the slider to define an inside pivot and a distal portion pivotally connected to the bracket to define an outside pivot,
   a coupler link having a proximal portion and a distal portion and being pivotally connected to the input link, the coupler link intersecting the input link at a location between the proximal and distal portions of the input link,
   an output link having a proximal portion pivotally connected to the distal portion of the coupler link to define an inside pivot and a distal portion pivotally connected to the bracket to define an outside pivot, and
   a biasing member for driving the coupler link as the vehicle door is moved between the closed position and the open position.

16. The sliding door mechanism of claim 15, wherein in the vehicle door closed position the inside pivot of each output link is positioned generally forward of the outside pivot toward the vehicle door, as the vehicle door is displaced from the vehicle body structure, the input link rotates in a first direction causing the coupler link and output link to rotate in a second direction, in the vehicle door open position the inside pivot of each output link being positioned generally rearward of the outside pivot away from the vehicle door, wherein movement of the inside pivot and outside pivot of each output link in substantial alignment with the outside pivot of each input link provides for the zero moment whereby the vehicle door is neither urged in the closed position nor the open position.

17. The sliding door mechanism of claim 16, wherein a plane intersecting the inside and outside pivots of each output link is spaced from the outside pivot of each input link during both the closing moment and opening moment, a distance between the plane and outside pivot of each input link defining a moment arm.

18. The sliding door mechanism of claim 15, further comprising a control mechanism connected to the vehicle side body structure and operatively associated with the input link of the lower four-bar link assembly, the control mechanism configured to rotatably and slidably receive the proximal portion of the input link, wherein the modulation of the closing and opening moments occurs as the input link rotates relative to the control mechanism.

19. The sliding door mechanism of claim 13, further comprising a middle link operatively connected to the middle guide rail and the vehicle sliding door, the middle link being one of manually and mechanically actuated to move the vehicle door between the closed and open positions, actuation of the middle link moving the upper and lower four-bar link assemblies.

20. A sliding door mechanism for a vehicle arranged to move a door from a door opening provided in a vehicle side body structure from a closed position to an open position, the sliding door mechanism comprising:
   an upper slide rail and a lower slide rail fixed to the vehicle side body structure;
   an upper slider associated with the upper rail and movable along the upper rail and a lower slider associated with the lower rail and movable along the lower rail;
   an upper link assembly operatively connected to the vehicle door and the upper slider; and
   a lower link assembly operatively connected to the vehicle door and the lower slider, wherein each of the upper and lower link assemblies is a four-bar linkage including
      a bracket fixed to the vehicle door, the bracket defining a fixed link,
      an input link having a proximal portion pivotally connected to the slider and a distal portion pivotally connected to the bracket,
      a coupler link having a proximal portion and a distal portion and being pivotally connected to the input link, the coupler link intersecting the input link,
      an output link having a proximal portion pivotally connected to the distal portion of the coupler link and a distal portion pivotally connected to the bracket, and
      a biasing member connected between the input link and the coupler link for driving the coupler link in one direction as the input link move in an opposite direction as the vehicle door is moved between the closed position and the open position, and
   each of the upper link assembly and lower link assembly is configured to vary a moment of force between a closing moment of force and opening moment of force associated with the movement of the vehicle door between the closed position and the open position, each of the upper link assembly and lower link assembly being configured such that the moment of force is substantially zero between when the vehicle door moves between the closed position and the open position.

21. The sliding door mechanism of claim 20, further comprising a control mechanism connected to the vehicle side body structure, the control mechanism including a fixed housing having a key-shaped opening and a cam configured to rotatably and slidably move within the key-shaped opening, the cam being located on the proximal portion of the input link of the lower link assembly, wherein the transition between one of the closing and opening moments to the other of the closing and opening moments for both the upper and lower link assemblies occurs as the cam rotates within the fixed housing.

* * * * *